(12) United States Patent
Kato

(10) Patent No.: US 6,296,679 B1
(45) Date of Patent: Oct. 2, 2001

(54) METHOD FOR HYDROCARBON STEAM REFORMING

(76) Inventor: Hajime Kato, 1438-98, Ouzenji, Asao-Ku, Kawasaki-Shi, Kanagawa-Ken (JP)

( * ) Notice: Subject to any disclaimer, the term of this patent is extended or adjusted under 35 U.S.C. 154(b) by 0 days.

(21) Appl. No.: 09/281,825

(22) Filed: Apr. 5, 1999

Related U.S. Application Data

(63) Continuation of application No. PCT/JP97/03494, filed on Oct. 1, 1997.

(30) Foreign Application Priority Data

| Oct. 3, 1996 | (JP) | 8-262945 |
| Jun. 6, 1997 | (JP) | 9-149407 |

(51) Int. Cl.$^7$ ............................................. C10J 3/48
(52) U.S. Cl. .................. 48/197 R; 422/188; 422/189; 422/206; 423/28; 423/30; 423/31; 423/179; 423/180; 423/181
(58) Field of Search .................. 48/197 R; 431/10, 431/11, 115, 166, 215; 432/176, 179, 180, 181, 199, 24, 28, 30, 31; 422/187, 188, 189, 192, 198, 206, 211

(56) References Cited

U.S. PATENT DOCUMENTS

| 4,098,588 | 7/1978 | Buswell et al. ............... 48/94 |
| 4,162,290 | 7/1979 | Crawford ..................... 422/190 |
| 4,604,051 | * 8/1986 | Davies et al. ................ 431/166 |
| 4,810,472 | 3/1989 | Andrew et al. ............... 422/197 |

FOREIGN PATENT DOCUMENTS

| 0 349 011 A | 1/1990 | (EP) . |
| 0 483 495 A | 5/1992 | (EP) . |
| 0 522 744 A | 1/1993 | (EP) . |
| 0 602 244 A | 6/1994 | (EP) . |
| 0 959 120 | 11/1999 | (EP) . |
| 53-64202 | 6/1978 | (JP) . |
| 7-481 | 6/1978 | (JP) . |
| 53-79767 | 7/1978 | (JP) . |
| 61-222903 | 10/1986 | (JP) . |
| 8-73867 | 3/1996 | (JP) . |

* cited by examiner

*Primary Examiner*—Hien Tran
*Assistant Examiner*—Basia Ridley
(74) *Attorney, Agent, or Firm*—Griffin & Szipl, P.C

(57) ABSTRACT

In a process for hydrocarbon steam reforming, a primary reformed gas is produced from a mixed gas of hydrocarbon and steam with use of a primary reforming means including an external combustion type of reforming furnace. A secondary reforming reaction of the primary reformed gas is carried out in the presence of air and/or oxygen. A burner assembly of the reforming furnace comprises burners for heating reforming tubes of the furnace and regenerators for preheating a combustion air flow to the burners. Combustion exhaust gas of the reforming furnace heats the second regenerator for preheating the combustion air to the second burner, while the first burner is in firing operation, whereas the combustion exhaust gas heats the first regenerator for preheating the combustion air to the first burner, while the second burner is in firing operation. The flow passage for the combustion exhaust gas is so controlled as to be switched to either of first and second flow passages in a predetermined time interval. A part of the combustion exhaust gas, which is 10% to 30% by weight relative to the total combustion exhaust gas of the reforming furnace, is introduced from an internal area of the furnace to first and second heat-exchangers, so that hydrocarbon feedstock, mixed gas of hydrocarbon and steam, and air and/or oxygen are heated by the heat-exchangers. Reformed gas produced in such a system is fed to a third heat-exchanger to heat the mixed gas of hydrocarbon and steam, and thereafter, it is delivered to a reformed gas delivery line. According to the process or method of these arrangements, high and economical energy efficiency and production efficiency can be achieved.

26 Claims, 10 Drawing Sheets

(A)

(B)

(A)

(B)

METHOD FOR HYDROCARBON STEAM REFORMING

This application is a Continuation of International Application No. PCT/JP97/03494, filed Oct. 1, 1997, which claims priority based on Japanese Patent Application Nos. 8-262945 and 9-149407, filed Oct. 3, 1996 and Jun. 6, 1997, respectively.

TECHNICAL FIELD OF THE INVENTION

The present invention relates to a method of hydrocarbon steam reforming, and more specifically, to such a method for producing reformed gas containing hydrogen and carbon oxide by a reaction of hydrocarbon with steam.

BACKGROUND OF THE INVENTION

Steam reforming methods with use of tubular reformer, e.g., so-called Topsoe method or ICI method are known as industrially available processes for producing synthesis gas or hydrogen. For instance, those kinds of processes are industrially in practical use, as being a steam reforming methods for producing reformed gas or synthesis gas, wherein a steam reforming reaction of hydrocarbons, such as methane ( $CH_4$ ), is carried out in the presence of catalyst, e.g., supported nickel catalyst, so that reformed gas or synthesis gas containing a desired $H_2/CO_2$ ratio or $H_2/CO$ ratio of hydrogen ($H_2$) and carbon oxide ($CO_2$ or CO) is produced.

In a conventional steam reforming method, a combustion furnace or heating furnace is used as a reformer, which is provided with a plurality of burners. A radiant-heating section of the furnace, e.g., a vertical box type of radiant-heating section, incorporates a plurality of reformer tubes arranged substantially vertically therein, the tubes being formed by centrifugal casting alloy pipes filled with supported nickel catalyst or the like. A mixed gas of hydrocarbons and steam is preheated and introduced into the radiant-heating section to pass through the reformer tubes. The burners heat the outer wall surfaces of the reformer tubes so that the heat required for the steam reforming reaction is given to the mixed gas downwardly flowing through the tubes. Such a type of steam reforming apparatus is known as an external combustion type of reforming furnaces, for example, Topsoe type reforming furnace.

Those kinds of steam reforming methods are generally embodied as industrial system including the reforming furnace combined with another appropriate type of reformer, which is used for industrial or chemical plants for producing ammonia synthesis gas, methanol synthesis gas or hydrogen.

For instance, a chemical process for production of ammonia synthesis gas generally comprises an internal combustion reactor type of reformer (a secondary reformer) combined with the reforming furnace (a primary reformer). Primary reformed gas produced by the primary reformer is introduced into the secondary reformer together with pressurized air, and the gas is mixed with the air therein. Oxygen in the air reacts with combustible components in the primary reformed gas, whereby the heat required for reforming reaction is obtained in the secondary reformer and nitrogen gas is produced as being a secondary reformed gas to be fed to the following ammonia synthesis process.

In a case of production of methanol synthesis gas, as in the production of the ammonia synthesis gas, an appropriate internal combustion reactor type of secondary reformer is combined with the primary reforming furnace, wherein a primary reformed gas obtained by the reforming furnace is fed to the secondary reformer together with oxygen to take a reaction between the oxygen and the combustible components in the primary reformed gas, thereby ensuring the heat necessary for a chemical reaction in the secondary reformer. In this kind of system, a portion of hydrogen, which may be surplus in the following methanol synthesis process, reacts with the oxygen so as to regulate the $CO/CO_2$ ratio to be a desired ratio proper to the methanol synthesis process.

In such systems having a combination of the primary reforming furnace and the secondary reformer, the temperature of the secondary reformed gas is set to be a relatively high temperature, and the gas produced in the secondary reformer is discharged therefrom. The gas, however, still possesses a large amount of sensible heat, which could have been effectively used in the steam reforming system. In order to effectively utilize such a sensible heat for improvement of the energy efficiency over the whole system, an improved arrangement is proposed e.g., in Japanese patent publication No.7-481, in which a heat-exchanger type of reformer having a plurality of reformer tubes in a vertical reactor vessel is used as a primary reformer.

However, it is not deemed that the steam reforming method with use of the combination of such a primary reformer and the aforementioned secondary reformer can achieve a sufficient energy efficiency. That is, it is difficult to completely supply or ensure the heat required for the reaction in the primary reformer only by the sensible heat of the secondary reformed gas effluent from the secondary reformer. Therefore, surplus air and/or oxygen has to be additionally fed to the secondary reformer so that the necessary heat of reaction in the secondary reformer is compensated for an exothermic reaction of the oxygen with the combustible components in the primary reformed gas. Such an excess feed of surplus air and/or oxygen for compensation of reaction heat is, however, involved in specific drawbacks or disadvantages. For example, if the excess air is fed to the secondary reformer in a steam reforming process for production of ammonia synthesis gas, surplus nitrogen is produced in the secondary reformer, which gas is fed to the following ammonia synthesis process. This requires an additional provision of means for removing excess nitrogen. Further, another problem is raised in that useful hydrogen in the reformed gas is considerably consumed in the secondary reformer by its reaction with the excess oxygen. If excess oxygen is fed to the secondary reformer in a steam reforming process for production of the alcohol synthesis gas or hydrogen gas, useful hydrogen in the reformed gas is considerably consumed by its reaction with the surplus oxygen. Still further, provision of compressor or blower for ensuring a pressure of reforming reaction is needed for an additional feed of the excess air or oxygen. This raises a further problem in that an additional power for driving those means is expendable, and therefore, it is not preferred for improving the energy efficiency of the whole system.

Another steam reforming method is disclosed in U.S. Pat. No. 4,162,290 in which an external combustion type of reforming furnace and a heat-exchanger type of reformer is provided in parallel so as to be used for a primary reforming step, and an internal combustion reactor type of reformer is used for a secondary reforming step, wherein an improvement of the thermal efficiency of the whole system is suggested. According to this U.S. patent, a mixed gas of hydrocarbons and steam, which is preheated in a convection-heating section of the furnace, is divided into two streams, which are introduced into the furnace and the heat-exchanger type of reformer respectively, so that the reforming reaction is partially carried out therein. The respective reformed gas streams are joined together and introduced into the internal combustion reactor type of reformer, as well as mixture of air and oxygen is introduced thereinto. Combustible components in the reformed gas of the primary reforming step reacts with the oxygen in the mixture, so that the secondary reforming step is carried out by the heat generated in the reaction, and then, the secondary reformed gas is fed to the heat-exchanger type of reformer to supply the heat of reaction therein by its heat-exchange with the mixed gas of hydrocarbons and steam.

In such a steam reforming process, it would be possible to decrease the heat for reaction in the heat-exchanger type of reformer by the parallel provision of the reforming furnace and the heat-exchanger type of reformer, whereby need for additionally feeding excess air to the internal combustion type of reformer can be restricted and effective use of the sensible heat of the secondary reformed gas can be attempted. Therefore, a thermal efficiency can be somewhat extensively improved over the whole steps.

However, in this kind of steam reforming process, the combustion exhaust gas exhausted from the reforming furnace is discharged through a convection-heating section directly connected to the furnace or additionally installed thereon, and therefore, the waste heat of the exhaust gas can be merely partially recovered. That is, the exhaust gas still has a temperature ranging from 900° C. to 1,100° C. This means that the heat energy of the fuel gas can be effectively used for the steam reforming reaction merely to an extent of 45%–55% of the entire exothermic heat (lower calorific value) of the fuel gas, and therefore that, the heat energy of the fuel gas cannot be effectively used for the steam reforming process.

In a plant for production of ammonia or methanol, a large mount of heat of reaction is further generated in its synthesis steps. Therefore, the total amount of sensible heat or heat of reaction, which is actually generated in the plant, extensively exceeds the total heat required for the whole plant. In general, those kinds of plants are provided with steam boilers using waste heat so as to generate steam of high pressure and high temperature (80–120 kg/cmG, 480–520° C.), which is fed to the steam reforming system and a steam turbine for driving a compressor, whereby the energy efficiency is attempted to be improved in the whole plant by energy conversion of the waste heat.

However, such an indirect heat recovery of the waste heat cannot achieve the high and economical energy efficiency and production efficiency of the whole plant, and therefore, an approach of improvement is required for achieving an effective and direct use of heat energy within the steam reforming system.

It is an object of the present invention to provide a method of hydrocarbon steam reforming, which can achieve a high and economical energy efficiency and production efficiency of the whole plant.

It is another object of the present invention to provide a method of hydrocarbon steam reforming, which improves a thermal efficiency and waste heat recovery efficiency in the whole plant.

DISCLOSURE OF THE INVENTION

The present inventor proposes a steam reforming process with use of a heat-exchanger type of reformer and/or an internal combustion reactor type of reformer, as well as an external combustion type of reforming furnace provided with a high cycle regenerative combustion system.

The present invention provides a method of hydrocarbon steam reforming for producing a reformed gas by a steam reforming reaction of a mixed gas of hydrocarbon and steam, which comprises: reforming the mixed gas of hydrocarbon and steam with use of an external combustion type of reforming furnace, and a heat-exchanger type of reformer and/or an internal combustion reactor type of reformer, the reforming furnace being provided with reforming tubes filled with catalyst and heating means for heating the reforming tubes, the heating means including burners for heating the reforming tubes and regenerators for preheating the combustion air flow to be fed to the burners;

wherein the combustion exhaust gas of the reforming furnace passes through a second flow passage provided with the second regenerator while the first burner is in firing operation, thereby heating the second regenerator for preheating the combustion air flow for the second burner, whereas said combustion exhaust gas passes through a first flow passage provided with the first regenerator while the second burner is in firing operation, thereby heating the first regenerator for preheating the combustion air flow for the first burner, said combustion exhaust gas being controlled to be switched in a predetermined time interval so as to alternately flow through either of the first and second passages; and wherein a part of said combustion exhaust gas, which is to be a predetermined ratio of the gas relative to the total combustion exhaust gas, is introduced from the internal area of the reforming furnace to a heat-exchanger so that at least one of hydrocarbon feedstock, said mixed gas of hydrocarbon and steam, air and/or oxygen, and fuel gas for the reforming furnace is heated by a heat-exchange action with said part of the combustion exhaust gas.

In a preferred embodiment, the present invention provides a method of hydrocarbon steam reforming for producing a reformed gas by a steam reforming reaction of a mixed gas of hydrocarbon and steam, which comprises: reforming the mixed gas of hydrocarbon and steam with use of an external combustion type of reforming furnace, and a heat-exchanger type of reformer and/or an internal combustion reactor type of reformer, the reforming furnace being provided with reforming tubes filled with catalyst and heating means for heating the reforming tubes, the heating means including a regenerative burner assembly provided with a regenerator for preheating a combustion air flow to be fed to a burner;

wherein combustion exhaust gas of the reforming furnace passes through fluid passages of the regenerator to be in heat-transferable contact with the regenerator so as to heat the regenerator, and the combustion air to be fed to said burner passes through said fluid passages to be in heat-transferable contact with the heated regenerator so as to be preheated up to a high temperature, introduction of the combustion exhaust gas into said fluid passage of the regenerator and introduction of the combustion air into the same fluid passage being so controlled as to be changed over in a predetermined time interval so that the combustion exhaust gas and the combustion air alternately flow through said fluid passage; and wherein a part of said combustion exhaust gas, which is to be a predetermined ratio of the gas relative to the total combustion exhaust gas produced in said reforming furnace, is introduced from the internal area of the reforming furnace to a heat-exchanger so that at least one of hydrocarbon feedstock, said mixed gas of hydrocarbon and steam, air and/or oxygen, and fuel gas for the reforming furnace is heated by a heat-exchange action with said part of the combustion exhaust gas.

According to the present invention, the heating means of the reforming furnace constitutes a regenerative combustion system which functions as a waste heat recovery means. The reforming furnace with the heating means enables improvement of a waste heat recovery efficiency or a thermal efficiency of the whole system and a considerable reduction of fuel gas consumption in a heat transfer section of the reforming furnace. For instance, an appropriate combination of the above reforming furnace and reformer allows the fuel gas consumption of the whole system to be reduced to an extent of approximately 35%–75%. Further, the combustion air preheating mechanism of regenerative type enables a compact design of the reforming furnace itself, as well as an extremely compact design of a conventional heat recovery means of the reforming furnace (convection-heating section), or partial elimination thereof. Thus, an initial cost of construction or installation of the reforming furnace can be extensively reduced; or otherwise, a large capacity of reforming furnace having a relatively compact size can be readily designed.

Further, excess air and/or oxygen can be prevented from being additionally fed to an internal combustion reactor type of reformer, owing to desirable determination of the heat balance of the heat-exchanger type of reformer and the reforming furnace. This fact, as well as the reduction of the fuel gas consumption, contributes to an improvement of the energy efficiency and production efficiency of the whole system.

In the present specification, the combustion air means ambient air, normal atmospheric air, or combustion air appropriately prepared or regulated in oxygen concentration or the like, which is fed to the burner so as to be mixed with hydrocarbon fuel and generate a combustion reaction in the furnace.

In a preferred embodiment of the method with use of the external combustion type of reforming furnace and the internal combustion reactor type of reformer, the mixed gas of hydrocarbon and steam is introduced into the reforming furnace so that the reforming reaction is partially carried out therein, and the partially reformed gas effluent therefrom is introduced into the internal combustion reactor type of reformer. According to such an arrangement, the fuel gas consumption for the whole system can be reduced to an extent of 35%–45% in dependence on the heat recovery effects of the regenerative combustion system of the reforming furnace, in spite of the fact that the arrangement of the system is simplified.

In a preferred embodiment of the present invention, the time interval or changeover time for switching the passage of the combustion exhaust gas is set to be no greater than 60 seconds, and the passage of the combustion exhaust gas is alternately switched to either of the first and second passages, whereby the combustion exhaust gas alternately flows through either of the first and second passages. Preferably, the regenerator has a honeycomb structure provided with a large number of fluid passages through which either of the combustion exhaust gas and the combustion air is alternately passed. More preferably, the regenerator is a stationary type or a rotary type of ceramic honeycomb regenerator which has desirable dimensions of the fluid passages and the honeycomb wall thickness.

From one aspect of the present invention, the aforementioned part of the combustion exhaust gas, which possesses sensible heat exceeding the sensible heat required for the regenerative system, is extracted through exhaust gas extracting means directly from the internal area of the reforming furnace. Preferably, the part of the gas to be extracted is set to be 10%–30% (by weight) with respect to the total circulation flow or total combustion air flow of the reforming furnace. Taking the specific heat and the flow rate into consideration as regards the combustion air flow and the combustion flue gas., the sensible heat of the combustion exhaust gas useful for preheating the combustion air normally exceeds the heat essentially required for preheating the combustion air, and therefore, a predetermined flow rate of the extracted part of the combustion exhaust gas is preferably delivered from the internal area of the reforming furnace into a heat-exchanger directly so as to heat any fluid to be fed to the steam reforming system, with use of the sensible heat of the combustion exhaust gas, whereby the thermal efficiency of the whole system can be effectively improved.

According to a preferred embodiment, the reformed gas passing through the internal combustion reactor type of reformer is transported or delivered to a reformed gas delivery line through a heat-exchanger, in which the mixed gas of hydrocarbon and steam, the air and/or oxygen, process steam or feed water for a steam generator exchanges heat with the reformed gas so as to be heated thereby. With this arrangement, the surplus heat is effectively used in the system and the heat balance of the whole system can be improved. Even though 10%–30% of the combustion exhaust gas is introduced from the furnace into the heat-exchanger to improve the thermal efficiency, the reformed gas effluent from the internal combustion type of reformer still has a considerable sensible heat. On the other hand, the heat required for preheating the mixed gas of hydrocarbon and steam, the air and/or oxygen, process steam or feed water for a steam generator up to a predetermined temperature is substantially greater than the sensible heat of the above 10%–30% gas. Accordingly, the sensible heat of the reformed gas can be effectively used for preheating any of those fluids within the system, so that the heat balance in the system can be further improved.

In a preferred embodiment, the reforming furnace and the heat-exchanger type of reformer are arranged in parallel. The mixed gas of hydrocarbon and steam is divided into discrete streams which are introduced into the reforming furnace and the heat-exchanger type of reformer respectively. The primary reformed gas effluent from the reforming furnace and the reformer are introduced into the internal combustion reactor type of reformer. Preferably, the predetermined ratio of the combustion exhaust gas of the reforming furnace is introduced into a first heat-exchanger as being a heating medium. The mixed gas of hydrocarbon and steam passes through the first heat-exchanger to be preheated by the above part of combustion exhaust gas, and then, it is fed to the reforming furnace. The combustion exhaust gas passing through the first exchanger is further introduced into a second heat-exchanger, and the air and/or oxygen passes through the second heat-exchanger to be preheated by the combustion exhaust gas, and then, it is fed to the internal combustion reactor type of reformer. More preferably, the secondary reformed gas of the internal combustion reactor type of reformer is fed to the heat-exchanger type of reformer so that the heat required for reforming reaction in the heat-exchanger type of reformer is gained by the sensible heat of the secondary reformed gas. The secondary reformed gas passing through the heat-exchanger type of reformer may be introduced into the third heat-exchanger. The mixed gas of hydrocarbon and steam is preheated by the sensible heat of the secondary reformed gas and thereafter, it is divided into discrete streams to be introduced into the reforming furnace and the heat-exchanger type of reformer. With these arrangements, the fuel gas consumption of the fuel gas for the whole system can be reduced to an extent of an order of 55%–75%.

In another preferred embodiment, the reforming furnace and the heat-exchanger type of reformer are arranged in series. The mixed gas of hydrocarbon and steam is introduced into the heat-exchanger type of reformer so that the reforming reaction is partially carried out therein. The partially reformed gas obtained in the reformer is fed to the reforming furnace, and the reformed gas effluent therefrom is fed to the internal combustion reactor type of reformer. Preferably, the above part of combustion exhaust gas exhausted from the reforming furnace is introduced into the second heat-exchanger. The combustion exhaust gas passing therethrough is further introduced into the first heat-exchanger. The air and/or oxygen is preheated through the second heat-exchanger, and the mixed gas of hydrocarbon and steam or the hydrocarbon feedstock, is preheated by the first heat-exchanger. More preferably, the secondary reformed gas effluent from the internal combustion reactor type of reformer is fed to the third heat-exchanger, and the mixed gas passing through the first heat-exchanger is further preheated in the third heat-exchanger by the sensible heat of the secondary reformed gas. With these arrangements, the fuel gas consumption of the fuel gas for the whole system can be reduced to an extent of an order of 55%–75%.

In still another preferred embodiment, the aforementioned part of combustion exhaust gas exhausted from the reforming furnace and/or the reformed gas effluent from the internal combustion reactor type of reformer are introduced into a heat-exchanger as being heating medium at a high temperature, so that the mixed gas of hydrocarbon and steam is heated up to a predetermined temperature range by a heat-exchange with the high temperature heating medium in the heat-exchanger. The mixed gas thus heated is introduced into an adiabatic reaction type of reactor which comprises a vertical cylindrical pressure vessel filled with catalyst. The sensible heat of the mixed gas allows a steam reforming reaction to be partially carried out therein, and the mixed gas effluent therefrom is introduced into the reforming furnace. According to such arrangements, further reduction of the fuel gas consumption for the reforming furnace can be achieved. This type of steam reforming method may be preferably applied to a process with use of a relatively compact steam reforming system.

BEST MODE FOR CARRYING OUT THE INVENTION

Preferred embodiments of the present invention will be described in detail with reference to the attached drawings.

Figure 1:
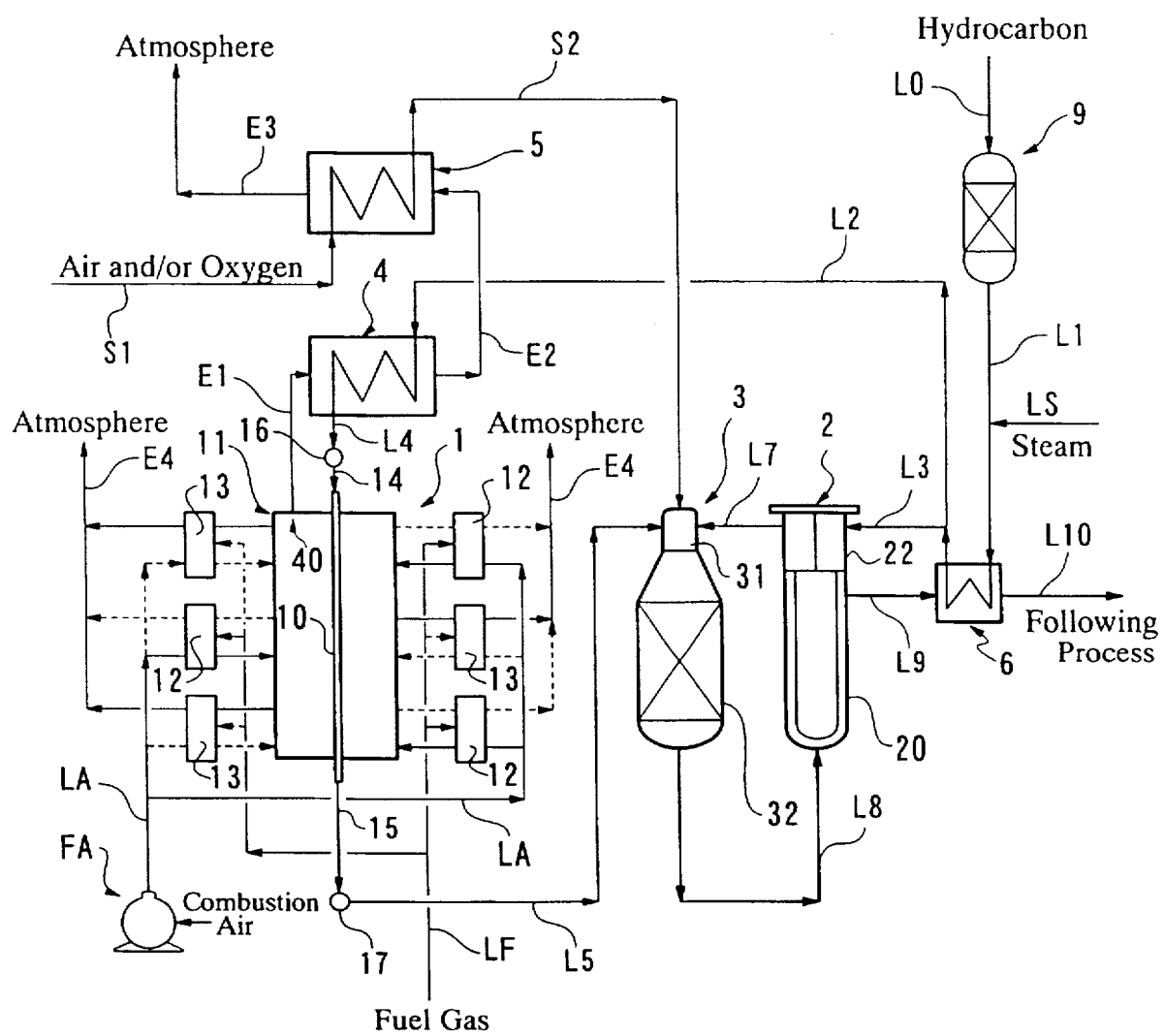
FIG. 1 is a schematic flow diagram showing an embodiment of the method of hydrocarbon steam reforming in accordance with the present invention, in which the method is applied to a process for producing the reformed gas to be used for an ammonia or methanol synthesis process, an external combustion type of reforming furnace and a heat exchanger type of reformer being arranged in parallel with respect to a feedstock supply line.

Referring to FIG. 1, the first embodiment of the present invention is illustrated which is applicable to a process for producing the reformed gas to be used for an ammonia or methanol synthesis process. As shown in FIG. 1, a plant for production of the reformed gas comprises an external combustion type of reforming furnace 1, a heat-exchanger type of reformer 2 and an internal combustion reactor type of reformer 3. A hydrocarbon feed containing methane ($CH_4$) as a main component is fed to the process for production of the reformed gas through feedstock supply lines L0, L1. The reforming furnace 1 and the reformer 2 defining a primary reforming system are connected with the lines L0, L1 in parallel by first and second discrete lines L2, L3 for a mixed gas of hydrocarbons and steam. The first line L2 is in communication with a mixed gas feed line L4 through the first heat-exchanger 4 and the line L4 is in communication with a reforming tube 10 of the reforming furnace 1, whereas the second line L3 is connected to an upper zone of the reformer 2.

In general, the hydrocarbon feedstock to be fed to the production process contains a small quantity of hydrogen sulfide, and therefore, the hydrocarbon feeding system is preferably equipped with a desulfurizer 9 if the system is not provided with pre-treatment means for desulfurization of the feedstock. The desulfurizer 9 comprises a vertical cylindrical pressure vessel internally charged with load mainly containing zinc oxide, and a downstream end of the line L0 is connected to an inlet port of the desulfurizater 9. A desulfurizing reaction of the hydrogen sulfide contained in the hydrocarbon feedstock takes place in the presence of the zinc oxide in the desulfurizer 9 so that the hydrogen-sulfide is removed from the system by the desulfurizer 9. If the hydrocarbon feedstock contains sulfur compounds other than the hydrogen sulfide, a hydrogenation/hydrogenolysis step is generally required in that a small quantity of hydrogen is added to the hydrocarbon feedstock to be fed to the dusulfurizer 9 so as to convert the sulfur compounds into the hydrogen sulfide in a hydrogenolysis reaction with use of catalyst. Means for carrying out such a step, however, is omitted from the FIG. 1 for the purpose of simplification of illustration.

An upstream end of the line L1 is connected to a hydrocarbon outlet port of the desulfurizer 9. A third heat-exchanger 6 is connected to a downstream end of the line L1, and a steam supply line LS for feeding a predetermined flow rate of process steam is joined with the line L1. The hydrocarbon feedstock desulfurized by the desulfurizer 9 is mixed with the steam from the line LS, and the mixed gas of hydrocarbons and steam is introduced into the third heat-exchanger. A reformed gas effluent from the reformer 3 is delivered through the reformer 2 and the heat-exchanger 6 to the following process, such as a process of an ammonia or methanol synthesis plant, whereas the mixed gas of hydrocarbons and steam through the line L1 is heated by a heat-exchange action with the reformed gas through the heat-exchanger 6.

The reforming furnace 1 has a heat-transfer section 11 provided with reforming tubes 10 and burner assemblies 12, 13. The burner assemblies 12, 13 are disposed on both sides of the heat-transfer section 11 and equipped with burners (not shown), which fire intermittently or periodically in a predetermined time interval. The burners of the respective burner assemblies 12, 13 are connected with a fuel gas source (not shown) by means of a fuel gas supply line LF and connected with a forced draft fan type of combustion air blower FA by means of a combustion air supply line L4. Each of the burner assembles 12, 13 is provided with regenerators (not shown), and combustion flue gas is extracted through the regenerators to an exhaust gas line E4.

The combustion flue gas in the heat-transfer section 11 is discharged from the reformed gas production plant by first and second exhaust systems, the first system including exhaust gas lines E1, E2, E3 and the second system including the exhaust gas line E4. The line E1 connected to the section 11 communicates with the line E2 through a first heat-exchanger 4, and the line E2 communicates with the line E3 through a second heat-exchanger 5. The mixed gas of hydrocarbons and steam is introduced into the heat-exchanger 4 by the line L2, and it exchanges heat with the exhaust gas effluent from the heat-transfer section 11. Air and/or oxygen is fed through the second heat-exchanger 5 to the process by feed lines S1, S2, and it exchanges heat with the exhaust gas effluent from the section 11. The lines S1, S2 are connected with a combustion reaction section 31 of the reformer 3, so that the air and/or oxygen required for combustion reaction in the reformer 3 is introduced into the section 31 by the lines S1, S2.

The reformer 3 defining the secondary reforming system is provided with the upper combustion reaction section 31 and a lower catalyst bed section 32. The combustion reaction section 31 is connected with the reforming furnace 1 and the reformer 2 by means of first and second delivery lines L5, L7 for primary reformed gas, respectively. The catalyst bed section 32 is connected with the reformer 2 by a delivery line L8 for secondary reformed gas so as to be in communication with a catalyst tube zone 20 of the reformer 2, through which the line L8 is in communication with reformed gas delivery lines L9, L10. Thus, the reformed gas effluent from the reformer 2 takes a heat-exchange action with the mixed gas of the line L1 in the third heat-exchanger 6 which is interposed between the reformed gas delivery lines L9, L10, and thereafter, it is delivered into the line L10. The line L10 is connected with the following ammonia or methanol synthesis plant (not shown) in order to transport the reformed gas for the successive process.

Referring to FIGS. 5 through 10, the structural arrangements of the reforming furnace 1 and the reformers 2, 3 will be described hereinbelow.

Figure 5:
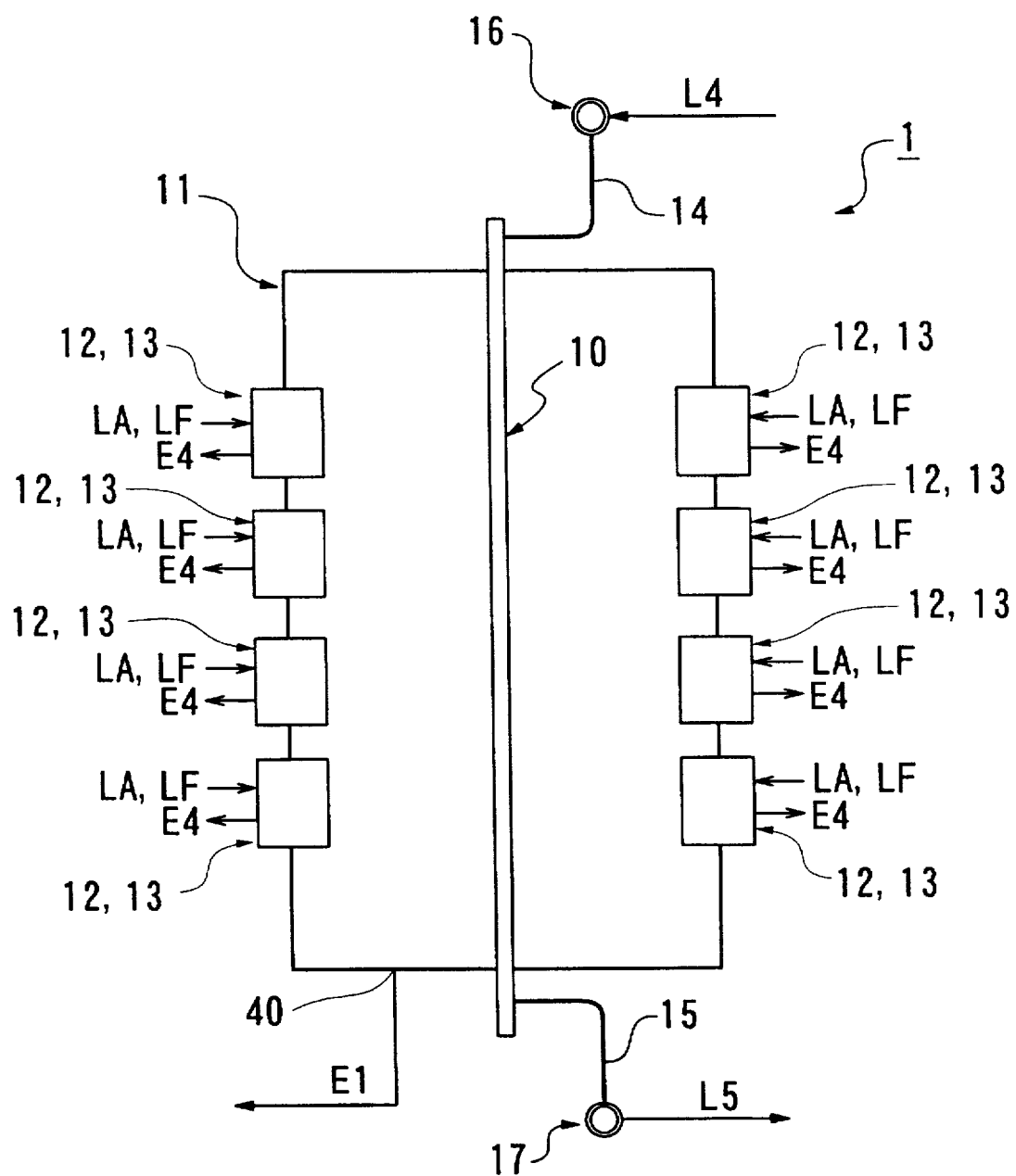
FIG. 5 is a schematic vertical cross-sectional view showing the whole arrangement of the reforming furnace as illustrated in FIGS. 1 through 4.

As shown in FIG. 5, the reforming furnace 1 constituting the primary steam reforming system comprises the aforementioned heat-transfer section 11 provided with the reforming tubes 10 vertically extending therethrough, and a distributor 16 communicating with the line L4. The reforming tubes 10 are connected with the distributor 16 through upper communication flow passages 14 and arranged substantially vertically in an internal area of the section 11. Lower end portions of the tubes 10 are connected through lower communication flow passages 15 with a collector 17, which is connected with the reformer 3 by the primary reformed gas delivery line L5. The tubes 10 shown in FIG. 5 are arranged in a formation of single row along the central zone of the furnace 1, but they may be arranged therein in a plurality of rows.

Figure 6:
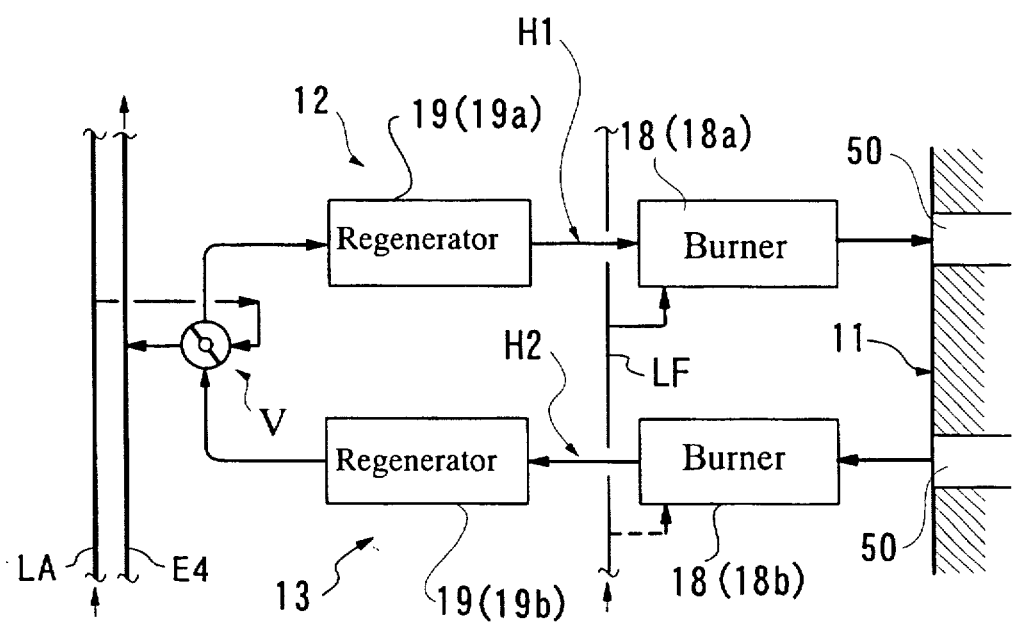
FIG. 6 is a schematic flow diagram which shows the arrangement of burner assemblies as shown in FIG. 5, an alternate switching manner of the burner assemblies in a pair being illustrated therein.
Figure 6:
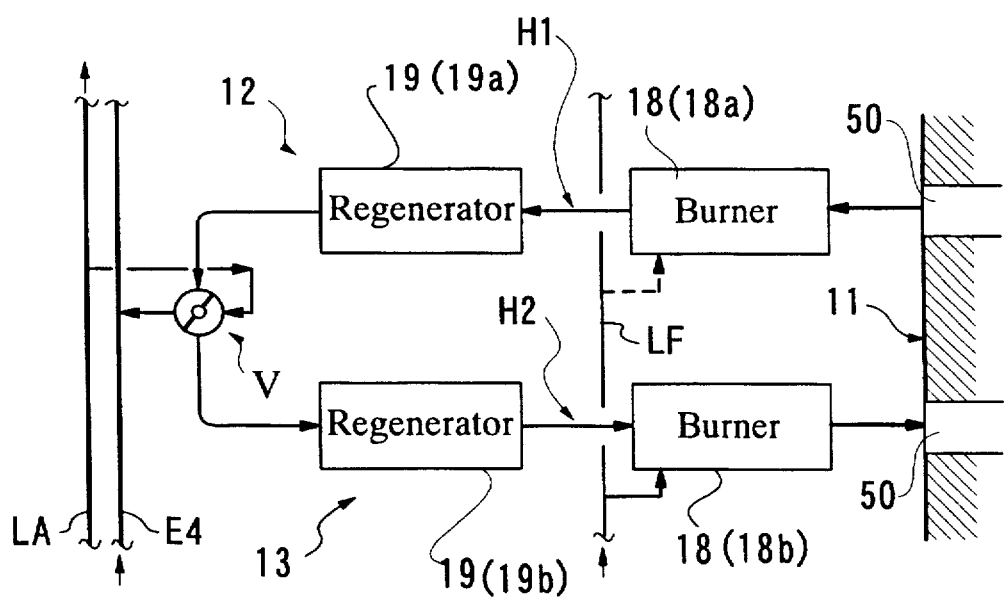

The burner assemblies 12, 13 are disposed on the side walls of the heat-transfer section 11 in different heights, the respective assemblies being spaced from each other in a widthwise direction of the reforming furnace 1 (In FIG. 5, the burner assemblies are illustrated in vertically spaced four positions). As shown in FIG. 6, each of the burner assemblies 12, 13 is provided with burners 18 respectively connected to the lines LF, LA and regenerative heat-exchangers 19 for preheating the combustion air. The heat-exchanger 19 functions to recover the heat of the combustion exhaust gas by a heat exchange action therewith (heat accumulation) and preheat the combustion air from the line LA by a heat exchange action therewith (heat emission). The burner assemblies 12, 13 constitutes a high cycle or high speed regenerative combustion system which takes a heat recovery operation and a combustion operation alternately in a predetermined time interval, e.g., 20 sec. to 120 sec., preferably, a time set to be no greater than 60 sec..

As shown in FIG. 6, first and second flow passages H1, H2, each of which incorporates the burner 18 and the regenerator 19 in series, selectively communicates with the lines LA, E4 by means of a four-way valve V. In a first position of the valve V as shown in FIG. 6(A), the first flow passage H1 is in communication with the line LA and the second flow passage H2 is in communication with the line E4, whereas in a second position of the valve V as shown in FIG. 6(B), the second flow passage H2 is in communication with the line LA and the first flow passage H1 is in communication with the line E4. The burners 18 are connected with a fuel supply line LF by means of a fuel supply valve of a three-way valve type or the like (not shown). The fuel supply valve is operated in synchronism with the four-way valve V under control of a controller (not shown) so as to alternately supply the fuel gas for either of the burner assemblies 12, 13. Thus, the burner 18$a$ of the assembly 12 is in combustion operation when the valve V takes the first position (FIG. 6(A)) and pauses the combustion operation while the valve V is in the second position (FIG. 6(B)). On the other hand, the burner 18$b$ of the assembly 13 is in combustion operation when the valve V takes the second position (FIG. 6(B)) and pauses the combustion operation while the valve V is in the first position (FIG. 6(A)).

While the first burner assembly 12 is fired, the combustion flue gas effluent from one of inlet/outlet ports 50 of the heat-transfer section 11 is exhausted through the regenerator 19b and the line E4, so that the sensible heat (waste heat) possessed by the flue gas is transferred to the regenerator 19b of the assembly 13 and accumulated therein (FIG. 6(A)). During the successive combustion operation of the assembly 13 (FIG. 6(B)), the regenerator 19b preheats the combustion air which is introduced from the line LA through the second flow passage H2. While the second burner assembly 13 is fired, the combustion flue gas effluent from the other of the inlet/outlet ports 50 is exhausted through the regenerator 19a and the line E4, so that the sensible heat (waste heat) of the flue gas is transferred to the regenerator 19a of the assembly 12 and accumulated therein (FIG. 6(B)). During the successive combustion operation of the assembly 12 (FIG. 6(A)), the regenerator 19a preheats the combustion air which is introduced from the line LA through the first flow passage H1. As the regenerator 19, a ceramic honeycomb structure or a metallic honeycomb structure can be preferably used, which has a large number of narrow flow passages. More preferably, a ceramic honeycomb, which is generally used as a catalyst media with a lot of narrow flow passages, can be employed as the regenerator 19. In an preferred application thereof, such a honeycomb type of regenerator has a desired volumetric efficiency, the honeycomb wall thickness is set to be less than or equal to 1.6 mm, and the honeycomb pitch (the spaced distance of the honeycomb walls) is set to be less than or equal to 5 mm. This kind of honeycomb structure is disclosed in Japanese Patent Laid-Open Publication No. 6-213585 (Application No. 5-6911), and therefore, further detailed description is omitted, referring to this publication.

Thus, the high temperature fluid (combustion flue gas) and the low temperature fluid (combustion air) are alternately supplied to the regenerator 18, which obtains heat from the high temperature fluid by heat-transferable contact therewith and give the obtained heat to the low temperature fluid by heat-transferable contact therewith, thereby carrying out a heat-exchange between the high temperature fluid and the low temperature fluid. According to this arrangement, the temperature effectiveness, which is conventionally deemed to be limited to the range of 60%–70%, can be enhanced to be the range of 70%–100% with the switching cycle time (time interval) being set to be no greater than 60 sec.

Figure 7:
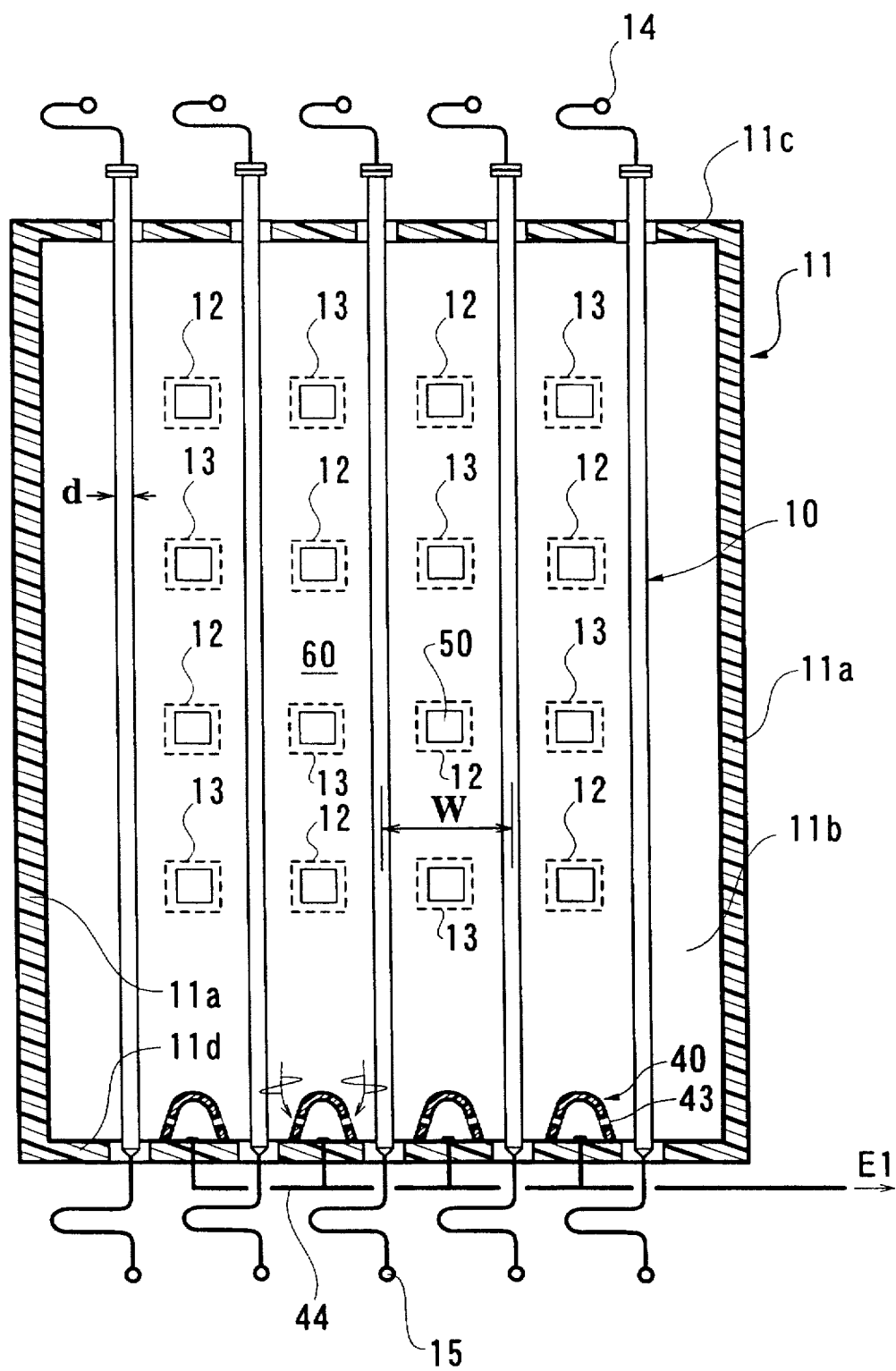
FIG. 7 is a schematic vertical cross-sectional view showing the whole construction of the reforming furnace as illustrated in FIGS. 1 through 4.

FIG. 7 is a schematic vertical cross-sectional view generally showing the construction of the reforming furnace 1, FIG. 8(A) is a schematic transverse cross-sectional view thereof, and FIG. 8(B) is a cross-sectional view of an exhaust gas duct taken along line I—I of FIG. 8(A).

As illustrated in FIG. 7, the reforming furnace 1 is constructed as a heating furnace comprising a heat-transfer section 11 defined by a furnace body, and reforming tubes 10 vertically extending through an intra-furnace area 60 of the section 11. The reforming tube 10 is a substantially vertical reformer tube made of a centrifugal casting alloy tube which is filled with a preselected catalyst for activating the reforming reaction of the mixed gas of hydrocarbons and steam, such as nickel catalyst. The upper end portions of the respective tubes 10 extend through a top wall 11C of the section 11 to be joined with the upper communication pipes 14 by hairpin tubes for absorbing heat expansion of the tubes 10, and the communication pipes 14 are connected to the distributor 16 (FIG. 5) constituting a supply header. The respective tubes 10 are arranged in a plurality of rows, each including the substantially vertical tubes 10. In the present embodiment, each of tube rows includes ten to twenty five tubes 10 in a straight line formation within the in-furnace area 60, and the tubes 10 are arranged in a formation of five parallel rows spaced a predetermined distance W in the widthwise direction of the section 11.

As shown in FIG. 7, the lower end portions of the tubes 10 extend through a bottom wall 11d of the section 11 to be joined with lower communication pipes by hairpin tubes, and the communication pipes 15 are connected to the line L5 by the collector 17 (FIG. 5). The section 11 has first and second side walls 11a, 11b lined by refractory bricks, castable refractory materials or the like, and joined with each other at the corner of the in-furnace area 60, the first side wall 11a extending in parallel with the tube rows and the second side walls 11b extending perpendicularly thereto.

The burner assemblies 12, 13 are arranged on the respective side walls 11b in a matrix formation of four lines and four rows, and the inlet/outlet ports 50 open on the side walls 11b in the zones between the tube rows.

The mixed gas of hydrocarbons and steam heated to the temperature range of 400° C.–700° C. is introduced into the reforming tubes 10 through the communication passages 14.

While flowing downwards in the tubes 10, the mixed gas is heated by the radiation heat and the convention heat of the high temperature combustion gas surrounding the tubes 10, whereby the mixed gas undergoes the endothermic reforming reaction in the presence of catalyst and is heated to the temperature range from 600° C. to 900° C. by the heat input across the tube wall. The high temperature reformed gas produced by the endothermic reforming reaction enters into the collector 17 (FIG. 5) through the communication passages 15 and is fed to the reformer 3.

Figure 8:
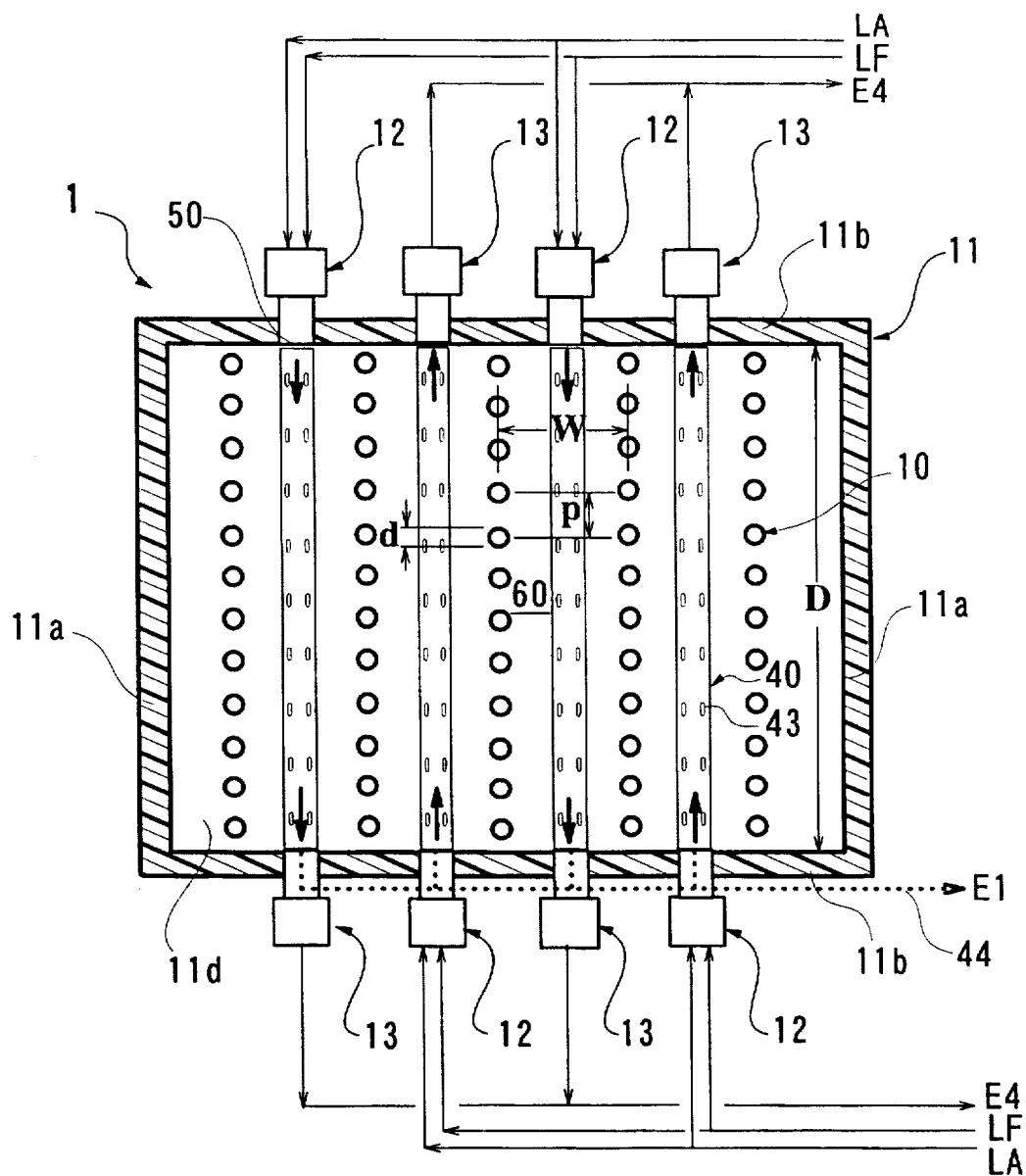
FIG. 8 is a schematic transverse cross-sectional view showing the whole construction of the reforming furnace as in FIG. 7, a vertical cross-sectional view showing a structure of an exhaust gas duct of the furnace being also illustrated on FIG. 8.
Figure 8:
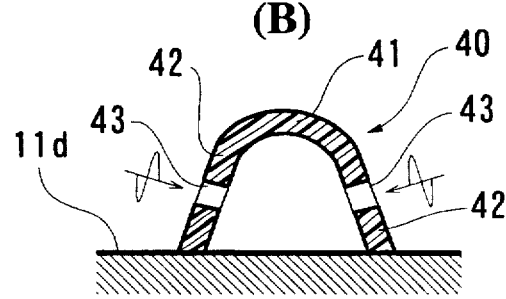

The heat load in the area 60 substantially corresponds to the amount of sensible heat required for carrying out the reforming reaction and heating the reformed gas to the predetermined temperature range. The spaced distance W of the adjacent tube rows and the depth D of the area 60 as shown in FIG. 8 is determined, based on the capacity of the burners 18 and the designed surface temperature of the tubes 10. However, the distance W is preferably so determined as to substantially indicate the value of D/W (Depth D/Distance W) in a range from 2 to 8, whereby uneven heating of the tube 10 (heating condition locally overheating a part of tube 10, resulting from direct impingement of the high temperature preheated air or combustion gas to the tube 10) can be avoided and a desired volume or thickness of the combustion gas required for sufficient heat radiation action of the high temperature combustion gas can be ensured.

More preferably, the distance P between the adjacent tubes 10 is so determined to substantially indicate the value of P/d (the distance P/the diameter d of the tube 10) in a range from 1.5 to 2.5, whereby the heat transmission per unit area of the tube 10 can present a necessary and sufficient value and the tube wall of the tube 10 can take an appropriate heat transfer action. Further, the length of the tube 10 may be determined to be a length in a permissible range of pressure drop of the gas flowing through the tube 10, so far as proper temperature gradient and heating capacity can be obtained.

Figure 4:
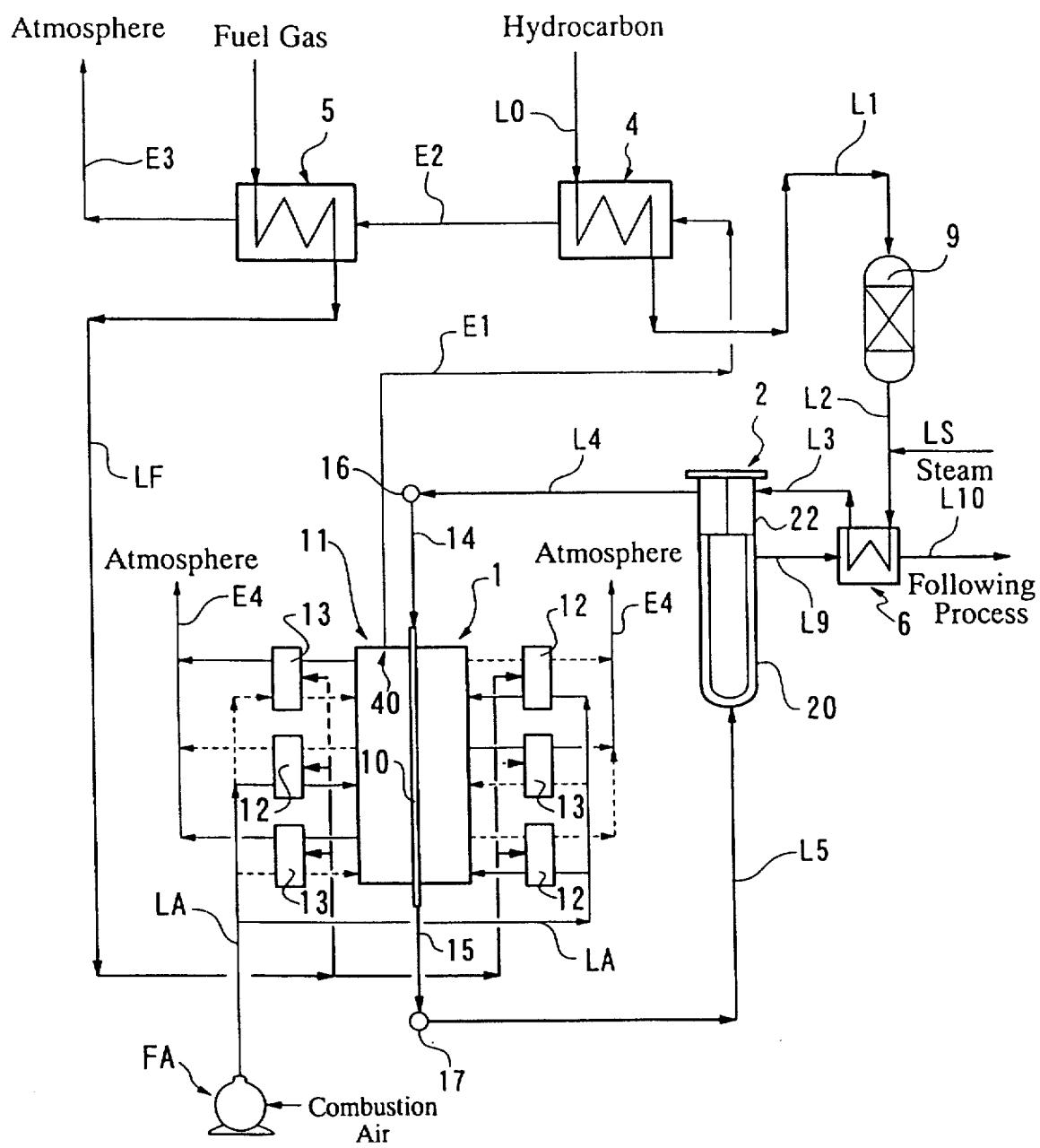
FIG. 4 is a schematic flow diagram showing another embodiment of the present invention applicable to a process for producing the reformed gas to be used for production of hydrogen gas, the process being provided with the reforming furnace and the heat-exchanger type of reformer.

As shown in FIGS. 7 and 8, exhaust gas ducts 40 are provided to be raised on a bottom wall 11d of the section 11, the ducts 40 extending between the rows of the tubes 10 in parallel with the tube rows and the side walls 11a. As shown in FIG. 8 (B), the duct 40 comprises a pair of side walls 42 raised on the bottom wall 11d and a top wall 41 over the walls 42. A plurality of exhaust flue gas discharge ports 43 open on the wall 42, each spaced a distance from each other and having a predetermined opening area. The zone defined inside of the walls 41, 42 is in communication with the in-furnace area through the ports 43, and constitutes a combustion flue gas passage extending on the bottom wall 11d in parallel with the tube rows and the side walls 11a. The duct 40 is connected to the line E1 by the communication passage 44 opening at an end of the duct 40, so that the predetermined flow rate of the combustion flue gas produced in the in-furnace area 60 is extracted through the duct 40, the passage 44 and the line E4 and introduced into the heat-exchanger 4 (FIG. 4).

Figure 9:
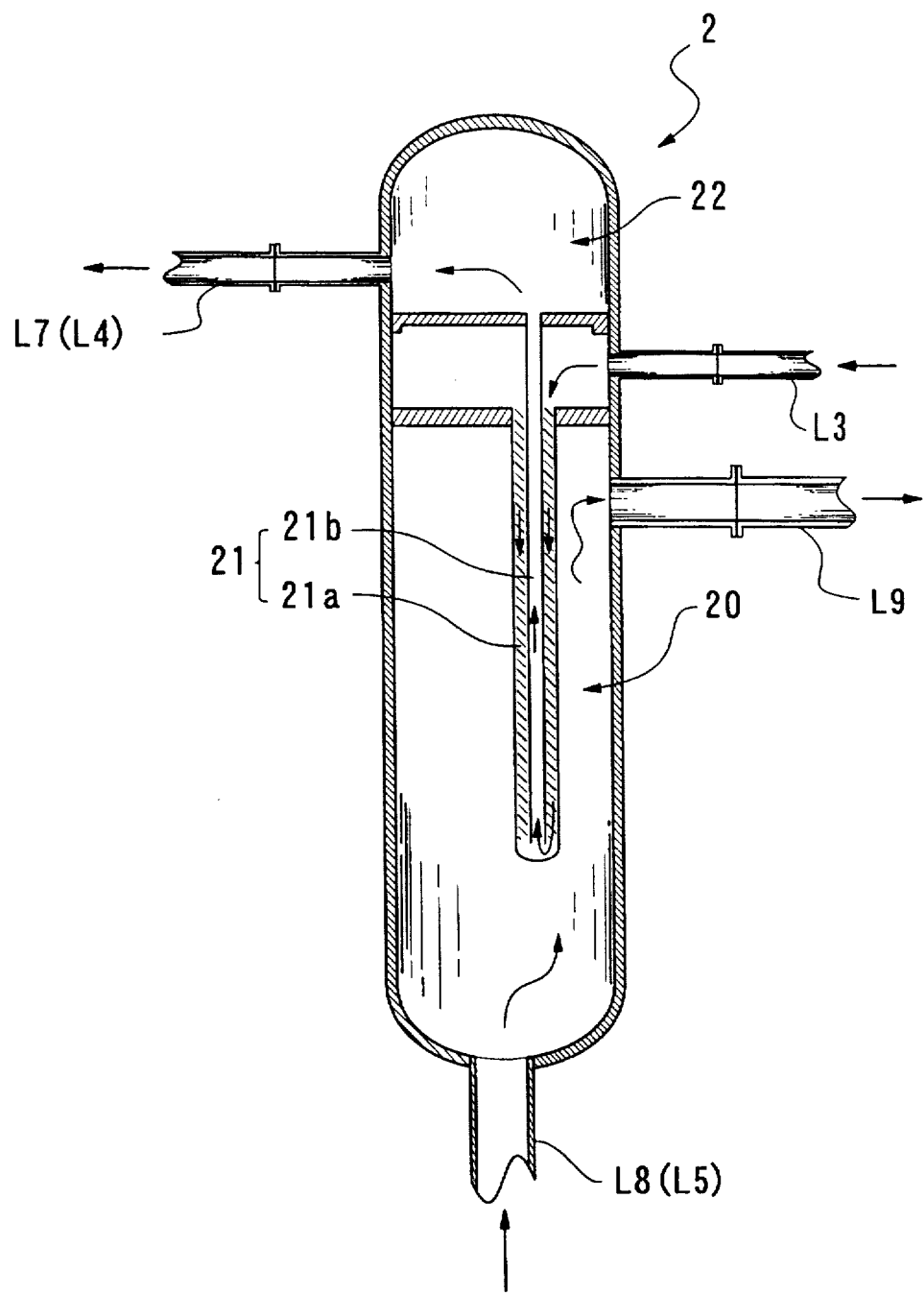
FIG. 9 is a schematic vertical cross-sectional view showing the whole construction of the heat-exchanger type of reformer as illustrated in FIGS. 1,2 and 4.

As shown in FIG. 9, the heat-exchanger type of reformer 2 comprises the catalyst tube zone 20 communicating with the line L8, L9 and the upper head section 22 in communication with the lines L3, L7. The zone 20 accommodates the catalyst tubes 21, each comprising a catalyst-charged portion 21a loaded with catalyst, such as nickel catalyst, and a hollow tube 21b. The mixed gas introduced from the line L3 into the portion 21a flows downward through the portion 21a and flows upward through the hollow tube 21b, and then, leaves the head section 22 and enters into the line L7.

The line L8 is connected to a bottom of zone 20, so that the secondary reformed gas effluent from the reformer 3 enters into the lower area of the zone 20 through the line L8. The reformed gas raises the temperature of atmosphere in the zone 20, as it flows upward in the zone 20. The reformed gas is delivered through the line L9 into the heat-exchanger 6 (FIG. 1).

Figure 10:
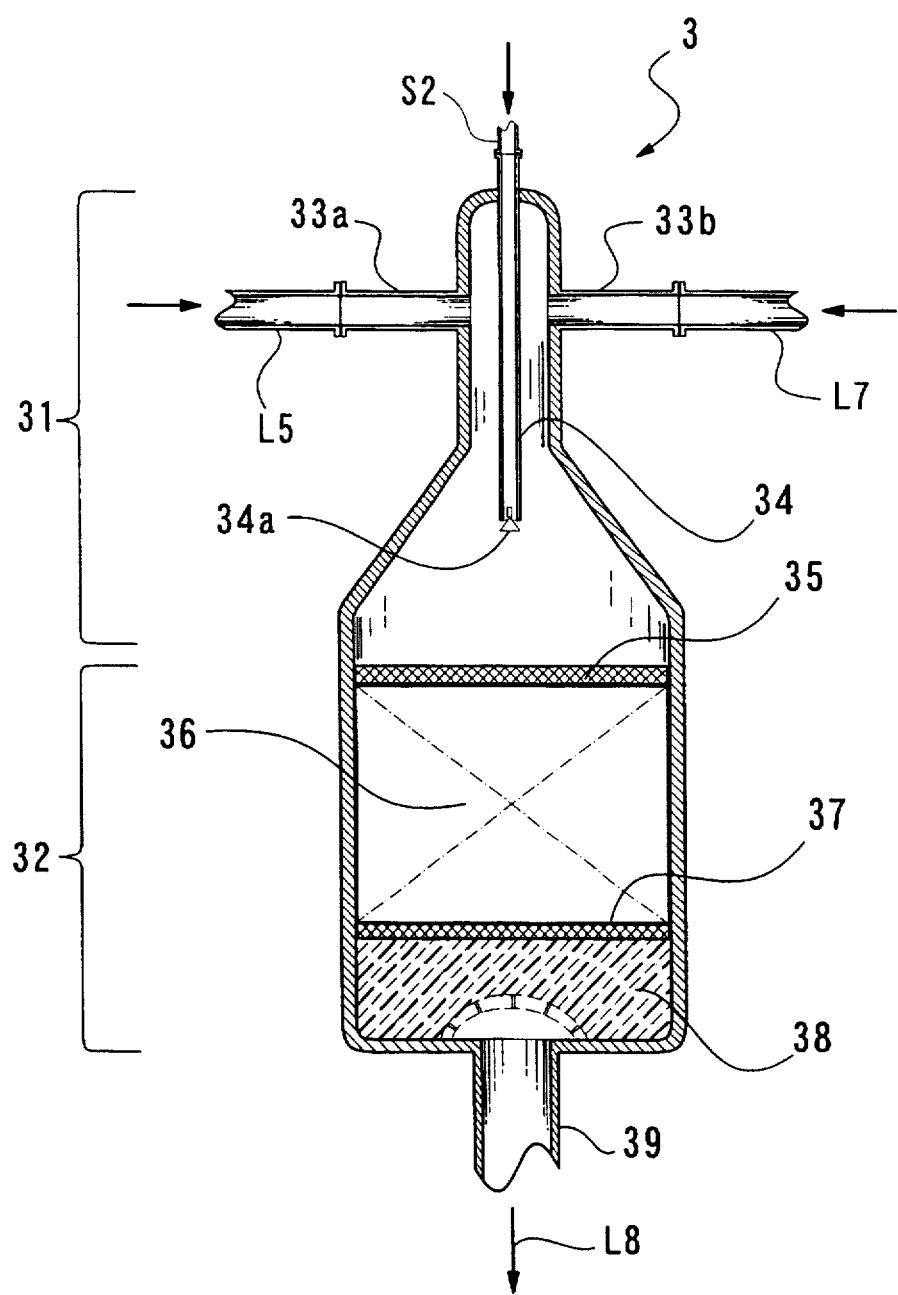
FIG. 10 is a schematic vertical cross-sectional view showing the whole construction of the internal combustion reactor type of reformer as illustrated in FIGS. 1 through 3.

Referring to FIG. 10, the internal combustion reactor type of reformer 3 is illustrated to have a generally conventional arrangement, which comprises the upper combustion reaction section 31 and the lower catalyst bed section 32.

An injector tube 34 is positioned along the center axis of the reformer 3 and extends through a reduced portion of the section 31 upwardly protruding. The line S2 is connected with an upper end of the tube 34, and a burner or mixer 34a is equipped at a lower end of the tube 34.

Primary reformed gas inlet ports 33a, 33b are formed on the wall of the reduced portion, and the lines L5, L7 are connected to the inlet ports 33a, 33b respectively. Thus, the section 31 is in communication with the furnace 1 and the reformer 2 through the lines L5, L7.

The catalyst bed section 32 in the enlarged portion of the reformer 3 includes an upper aluminum ball layer 35, a nickel catalyst layer 36 and a lower aluminum ball layer 37 on a refractory bottom layer 38, and those layers are in communication with a secondary reformed gas delivery tube 39 which communicates with the line L8.

The hydrocarbon steam reforming method of the first embodiment in use of the above described process will be described hereinafter.

The hydrocarbon feedstock mainly containing methane ($CH_4$) is introduced through the line L0, in which the hydrogen sulfide in the hydrocarbons is removed therefrom by a reaction with the zinc oxide in the desulfurizer 9. If desired, a step of hydrogenolysis reaction for converting the sulfur compounds into the hydrogen sulfide is carried out in the line L0.

The desulfurized hydrocarbons through the line L1 are mixed with the process steam fed from the line LS, and then, introduced into the heat-exchanger 6, in which the mixed gas of hydrocarbons and steam is heated by a heat-exchange action with the secondary reformed gas through the line L9. The mixed gas of hydrocarbons and steam delivered from the heat-exchanger 6 is divided into two streams of the lines L2, L3. The mixed gas through the line L2 is fed to the first heat-exchanger 4 whereas the mixed gas through the line L3 is fed to the heat-exchanger type of reformer 2. The concentration or mixture ratio of the steam and hydrocarbons is, in general, set to correspond to the mole ratio "$H_2O$/hydrocarbons" ranging from 1.5 to 6.0.

The mixed gas delivered to the first heat-exchanger 4 heat-exchanges therein with the combustion exhaust gas through the line E1 to be preheated up to the temperature range of 400° C.–700° C., and then, it is introduced into the reforming tubes 10 of the reforming furnace 1. The mixed gas is raised in temperature in accordance with a balance of the heat consumed by an endothermic reforming reaction and the heat input of the high cycle regenerative burner assemblies 12, 13 transferred across the tube wall. As the mixed gas flows downward through the nickel catalyst layer in the tube 10, the composition of the mixed gas approaches an equilibrium condition substantially in proportion with the temperature gradient in the axial direction of the tube 10, which promotes the reforming reaction. Thus, the mixed gas undergoing the primary reforming reaction is heated up to a temperature generally in the range of 600° C.–900° C., and is delivered from the reforming furnace 1 to the combustion reaction section 31 of the secondary reformer 3 through the line L5, as being the primary reformed gas containing hydrogen, carbon and hydrocarbon. In the present embodiment, the conversion ratio of the hydrocarbons is set to be a mole ratio ranging from 20% to 60%.

The burner assemblies 12, 13 are operated in synchronism with the four-way valve (FIG. 6) under the high-speed switching control by the controller (not shown). The burners 18 (18a:18b) is alternately fed with the combustion air under the delivery pressure of the blower FA and the fuel gas through the line LF, so that the burners 18a, 18b alternately fire. In FIG. 1, the solid lines of the lines LA, E4 indicate a first operation mode wherein the first burner assembly 12 takes a combustion operation and the second burner assembly 13 carries out a heat-accumulation. On the other hand, the dotted lines of the lines LA, E4 indicate a second operation mode wherein the second burner assembly 13 takes the combustion operation and the first burner assembly 12 carries out the heat-accumulation. Those operation modes are switched in a predetermined time interval preferably set to be no greater than 60 seconds.

The combustion air through the line LA is heated by heat emission of the heat-exchanger 19 when the combustion air is in heat-transferable contact therewith, so that the temperature of the combustion air is raised, e.g., up to a range of 800° C.–1500° C. The combustion air thus highly preheated takes a combustion reaction with the fuel gas from the burner 18 so as to heat the reforming tubes 10. Most of combustion exhaust gas produced in the section 11 exchanges heat with the heat-exchanger 19 to be cooled down to, e.g., a temperature range from 50° C. to 200° C., and then, exhausted to the atmosphere through the line E4 and a stack or the like.

The remaining portion of the combustion exhaust gas, preferably, 10%–30% by weight thereof is extracted from the section 11 through the exhaust gas dust 40 and the lines E1, E2, so that the extracted gas exchanges heat with the mixed gas of the line L2 and the air and/or oxygen of the line S1 in the heat-exchangers 4,5 respectively. The exhaust gas of the line E3 thus cooled down to the temperature range of 100° C.–25° C. is discharged to the atmosphere through the stack or the like.

The mixed gas to be fed to the primary reformer 2 through the line L3 exchanges heat with the secondary reformed gas of the line L9 in the heat-exchanger 6 to be heated to a temperature range of 400° C.–650° C. The mixed gas of hydrocarbons and steam introduced into the primary reformer 2 flows downward around a periphery of the respective catalyst elements through the catalyst-charged portions 21a in the reformer tubes 21, and then, the gas is raised through the upward flow passages of the tubes 21 (the upward fluid flow tubes 21b ) to be introduced into the combustion reaction section 31 of the secondary reformer 3 through the line L7.

The primary reformed gas produced by the primary reforming steps in the primary furnace 1 and reformer 2 is introduced into the combustion reaction section 31, and the air and/or oxygen stream preheated to the temperature range of 400° C.–650° C. by the heat-exchanger 5 is introduced into the injector tube 34 of the section 31 (FIG. 10) to reacts with the primary reformed gas. The combustible components (hydrogen, carbon mono-oxide, carbon) in the primary reformed gas take an exothermic reaction with the air and/or oxygen, whereby the heat required for steam reforming reaction is obtained to generate and promote the reforming reaction of steam and hydrocarbons. If desired, the air and/or oxygen may be fed to the section 31 in a form of mixture with steam. In general, the temperature of the reformed gas produced in the section 31 can be set to be in a range of 900° C.–1200° C. The reformed gas passes through the catalyst bed 36 in the section 32 of the reformer 3, and thereafter, delivered to the line L8 through the delivery tube 39.

Therefore, most of the unreacted hydrocarbons in the primary reformed gas reacts with the steam in the section 31 and the reaction of the gas is carried out in the section 32 in such a manner that an equilibrium condition of the reforming reaction is attained, and thus, the state of gas substantially presents an equilibrium condition in the reformed gas effluent zone of the reformer 3 (the delivery tube 39). The secondary reformed gas thus produced is delivered to the primary reactor 2 through the line L8 as being a heating medium.

The reformed gas introduced into the lower zone of the primary reformer 2 (reformer tube zone 20) flows upward in contact with the outer wall surfaces of the reformer tubes 21 to heat them by the sensible heat of the gas. Therefore, the mixed gas of hydrocarbons and steam flowing downward in the catalyst-charged portion 21a is heated up to the temperature, e.g., in a range from 600° C. to 900° C. so that the reforming reaction is carried out as in the aforementioned manner to produce the primary reformed gas in the reformer 2. The conversion ratio of hydrocarbons therein can be set to be in a range of 20%–60% in mole ratio.

The secondary reformed gas cooled in the reformer 2 is delivered through the line L9 to the third heat-exchanger 6, in which the gas is further cooled by heat-exchange with the mixed gas of hydrocarbons and steam through the line L1, and then, the gas is delivered through the line L10 to a refining system of the following ammonia or methanol synthesis plant. In this embodiment, the temperature condition of the reformed gas through the line L9 is preferably set to be a desired temperature in a range of 500° C.–700° C., and the temperature condition thereof through the line L10 is set to be a desired temperature in a range of 300° C.–500° C.

Figure 2:
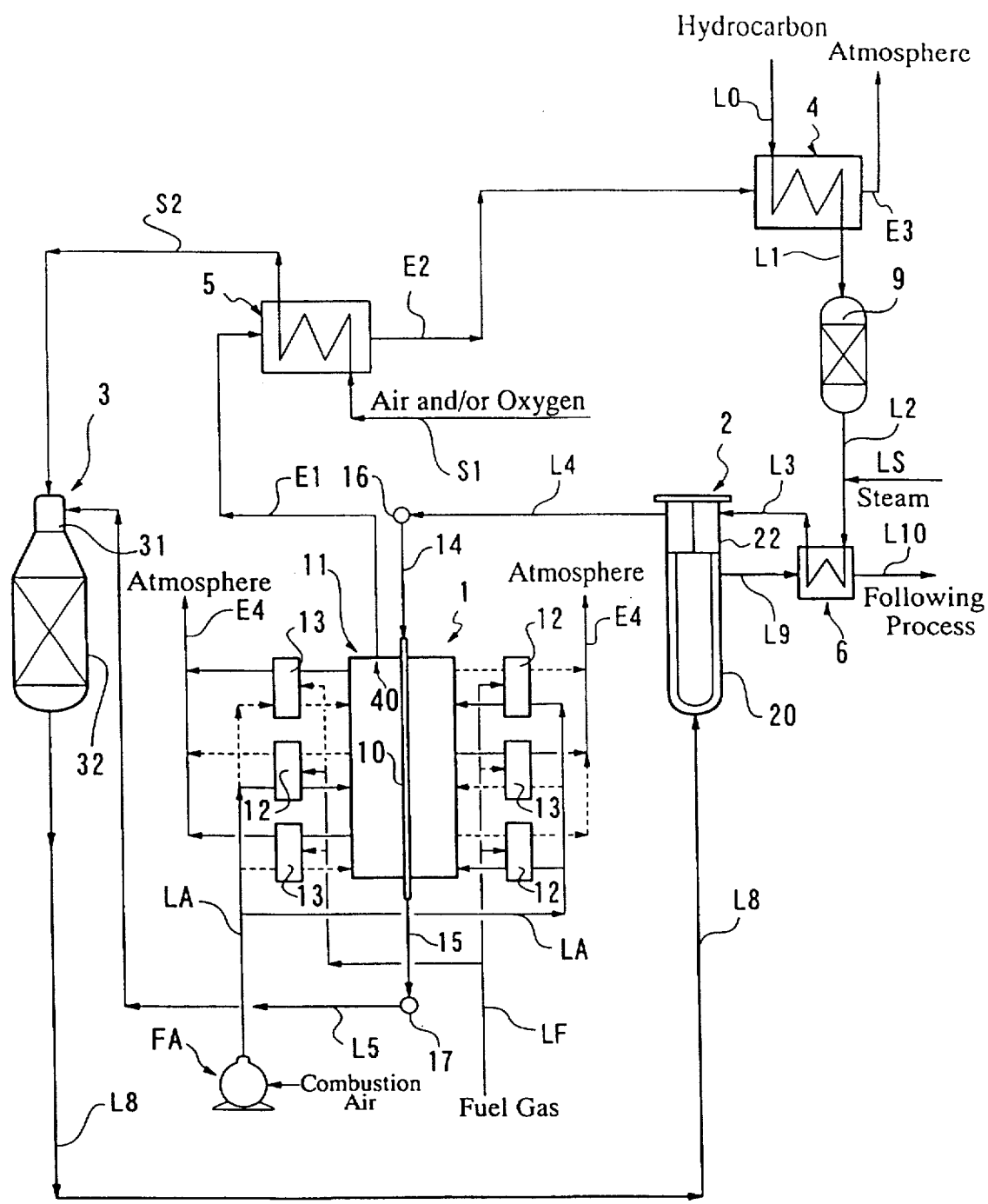
FIG. 2 is a schematic flow diagram showing another embodiment of the present invention applicable to the process for producing the reformed gas to be used for the ammonia or methanol synthesis process, the reforming furnace and the reformer being arranged in series with respect to the feedstock supply line.
Figure 3:
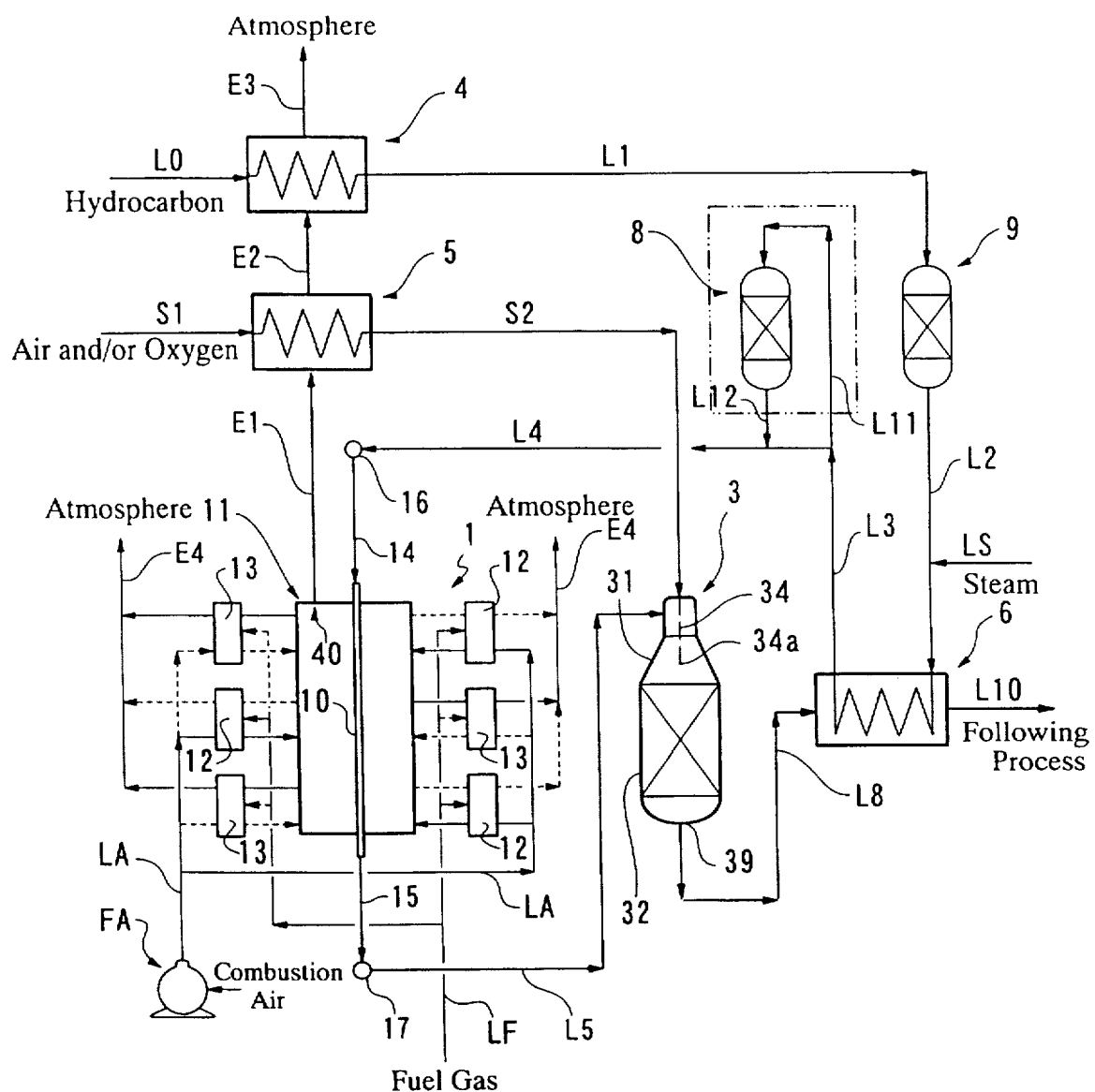
FIG. 3 is a schematic flow diagram showing still another embodiment of the present invention applicable to the process for producing the reformed gas to be used for the ammonia or methanol synthesis process, the reforming furnace and an internal combustion reactor type of reformer being arranged in series with respect to the feedstock supply line.

With reference to FIGS.2 and 3, the second and third embodiments of the present invention will be described hereinafter, wherein the substantially same or similar elements or means as those of the first embodiment are indicated by the same reference numerals as in FIG. 1.

The plant for production of the reformed gas as illustrated in FIG. 2 comprises the external combustion type of reforming furnace 1, the heat-exchanger type of reformer 2 and the internal combustion reactor type of reformer 3, which have substantially the same constructions as those of the first embodiment have. The plant of this second embodiment, however, differs from the first embodiment in that the reforming furnace 1 and the reformer 2 is arranged in series by the lines L3, L4.

Further, the first heat-exchanger 4 is interposed between the lines L0, L1 , and is positioned on the downstream side of the second heat-exchanger 5 with respect to the exhaust gas lines E1, E2 in order to restrict an excess temperature rise of hydrocarbons. Therefore, the hydrocarbon feedstock fed through the lines L0, L1 is heated up to an appropriate temperature region by the heat-exchangers 4,6 and is passed through the reformer 2 and the furnace 1 stepwisely by the lines L3, L4, and then, introduced into the secondary reformer 3 through the line L5 as the primary reformed gas. The secondary reformed gas produced in the secondary reformer 3 is introduced into the lower area of the primary reformer 2 through the line L8 , whereby the heat required for heating and reforming the mixed gas of hydrocarbons and the steam is supplied by the sensible heat of the secondary reformed gas. Then, the secondary reformed gas heats the mixed gas in the heat-exchanger 6 and thereafter, it is delivered through the line L10 to a refining system of the following ammonia or methanol synthesis plant (not shown). As the other arrangements or constructions of the plant of this embodiment are substantially the same as those of the first embodiment, further descriptions thereof are omitted.

With reference to the FIG. 3, the third embodiment of the present invention will be described hereinafter.

As shown in FIG. 3, the plant for production of the reformed gas comprises the external combustion type of reforming furnace 1 and the internal combustion type of reformer 3, and the line L1 for feeding the hydrocarbon feedstock mainly containing methane ($CH_4$) to the process is connected with the upstream end of the line L1 through the first heat-exchanger 4. The heat-exchanger 4 allows the hydrocarbon feedstock to be heated up to the temperature range of 300° C.–400° C. by a heat-exchange between the hydrocarbon feedstock at a relatively low temperature and the combustion exhaust gas from the reforming furnace 1.

As in the first and second embodiments, the line L1 is connected at its downstream end to the desulfurizer 9 and the line L2 is connected at its upstream end to the hydrocarbon outlet port thereof. The third heat-exchanger 6 is connected to the downstream end of the line L2, and the line LS for feeding process steam is joined to the line L2.

The mixed gas outlet port of the heat-exchanger 6 is connected to the upstream end of the line L3, the downstream end of which is joined to the upstream ends of the lines L4, L11. The line L4 is connected to the distributor 16 of the reforming furnace 1 defining the primary reformer.

An adiabatic reaction type of reactor 8, which is shown in the area of FIG. 3 enclosed by phantom lines (dotted lines), is preferably installed in the feed system of the mixed gas of hydrocarbons and steam, in a case where a further preferred economical process can be provided in view of the heat balance of the whole plant including ammonia or methanol synthesis plant. The reactor 8 comprises a vertical cylindrical pressure vessel filled with nickel catalyst therein, and the downstream end of the line L11 is connected to a mixed gas inlet port of the reactor 8. In a steam reforming process, in which the mixed gas of hydrocarbons and steam flows through the reactor 8, the heat required for the reforming reaction in the reactor 8 is gained by the sensible heat of the mixed gas, which is heated up to the temperature in a range of 600° C.–750° C. by the heat-exchanger 6. Therefore, the steam reforming reaction of the mixed gas is generated and partially performed in the reactor 8, and the temperature of the mixed gas descends therein down to a temperature range of 450° C.–600° C.

The reforming furnace defining the primary reformer and the reformer 3 defining the secondary reformer are connected in series by the lines L4, L5. As the arrangements and constituents of the furnace 1 and the reformer 3 are substantially the same as those shown in FIGS. 5 to 8 and FIG. 10.

According to the steam reforming method of the third embodiment in use of the aforementioned system, the hydrocarbons mainly containing methane are fed to the process through the lines L0, L1, L2. In the heat-exchanger 4, the hydrocarbon feedstock exchanges heat with the combustion exhaust gas of the furnace 1 to be heat up to the temperature range of 300–400° C., and then, fed through the line L1 to the desulfurizer 9, in which a small quantity of hydrogen sulfide in the feedstock is removed by a reaction with the zinc oxide in the desulfurizer 9. If required, a hydrogenolysis reaction step for conversion of sulfur to hydrogen sulfide is carried out in the lines L0 or L1.

The hydrocarbon feedstock desulfurized in the desulfurizer 9 is mixed in the line L3 with process steam fed through the line LS, and then, flows through the third heat-exchanger 6 to be heated up to the temperature range of 400° C.–700° C. by a heat-exchange with the reformed gas effluent from the reformer 3. Thereafter, the mixed gas is fed to the reforming furnace 1 through the line L4 and the distributor 16.

If desired, the mixed gas of hydrocarbons and steam through the line L2 is heated up to the temperature range of 600° C.–750° C. by the heat-exchanger 6 so as to be fed to the reactor 8, in which the steam reforming reaction of the mixture of hydrocarbons and steam is partially carried out. The heat required for the steam reforming reaction is supplied for the reactor 8 by the sensible heat of the mixed gas itself, and the temperature of the gas is lowered to the range from 450° C. to 600° C. therein. The mixed gas at least partially reformed in the reactor 8 is fed to the distributor 16 of the reforming furnace 1 by the lines L12, L4.

The mixed gas introduced into the reforming furnace 1 is heated up to the temperature range of 600° C.–900° C. with the burner assemblies 12, 13 being fired in a high cycle switching operation. The reforming reaction of the mixed gas is carried out in the reforming tubes 10 to produce the primary reformed gas containing hydrogen and carbon, as well as unreacted hydrocarbons. The primary reformed gas effluent from the furnace 1 is introduced through the collector 17 and the line L5 into the combustion reaction section 31 of the reformer 3.

A part of the combustion exhaust gas, preferably 10%–30% by weight thereof exchanges heat with the air and/or oxygen of the line S1 in the second heat-exchanger 5, and exchanges heat with the hydrocarbon feedstock of the line L0 in the first heat-exchanger 4. The exhaust gas of the line E3 thus cooled down to the temperature ranging from 100° C. to 250° C. is discharged to the atmosphere through the stack or the like.

The primary reformed gas introduced into the combustion reaction section 31 is mixed with the air and/or oxygen which is preheated to the temperature range of 400° C.–650° C. by the heat-exchanger 5. The combustible components (hydrogen, carbon mono-oxide, carbon) in the primary reformed gas generate an exothermic reaction with the air and/or oxygen, thereby ensuring the heat required for steam reforming. The reformed gas of the section 31 passes through the catalyst bed 36 of the section 32 (FIG. 10), and then, it is delivered to the line L8 through the delivery port 39.

The reformed gas thus produced is delivered to the third heat-exchanger 6 as a heating medium, which exchanges heat with the mixed gas of hydrocarbons and steam through the line L2, whereby the reformed gas is cooled and delivered to a refining system of the following ammonia or methanol plant (not shown). The steam reforming method of this embodiment can be preferably applicable to, in particular, a relatively compact steam reforming system. According to the method of this embodiment, a saving of the fuel gas consumption for the whole process can be achieved to an extent of 35%–45%.

According to the first, second and third embodiments, the external combustion type of reforming furnace 1 is used as the primary reformer in the primary reforming step in which the primary reformed gas is produced from the mixed gas of hydrocarbons and steam, and the internal combustion reactor type of reformer 3 is used as the secondary reformer in the secondary reforming steps, in which the secondary reforming reaction of the primary reformed gas is carried out to in the presence of air and/or oxygen. The burner assemblies 12, 13 of the reforming furnace 1 comprises a plurality of burners 18 for heating the reformer tubes 10 and a plurality of regenerators 19 for preheating the combustion air flow to be supplied to the burners 18, wherein the combustion exhaust gas of the furnace 1 flows through the second flow passage H2 during the combustion go operation of first burner 18$a$, so that the second regenerator 19$b$ is heated for successively preheating the combustion air flow toward the second burner 18$b$, and wherein the combustion exhaust gas of the furnace 1 flows through the first flow passage H1 during the combustion operation of second burner 18$b$, so that the first regenerator 19$a$ is heated for successively preheating the combustion air flow toward the first burner 18$a$. The combustion exhaust gas is selectively switched to flow through either of the first and second fluid passages H1,H2 every predetermined time interval. The predetermined ratio of the combustion exhaust gas of the furnace 1, preferably 10%–30% by weight of the fluid, is delivered from the furnace 1 to the first and second heat-exchangers 4,5, in which the hydrocarbon feedstock or the mixed gas of hydrocarbons and steam, and the air and/or oxygen are heated by the heat-exchangers 4, 5.

The reformed gas effluent from the reformer 3 is fed to the third heat-exchanger 6 to heat the mixed gas of the hydrocarbons and steam therein, and then, delivered to the line L10. In the respective embodiments, the temperature condition of the secondary reformed gas through the line L10 depends on the heat demand for preheating the mixed gas of hydrocarbons and steam, and it is so determined as to achieve an optimum heat balance, taking the preheating of the mixed gas into consideration.

If desired in the third embodiment, the mixed gas of hydrocarbons and steam is heated to a relatively high temperature by the third heat-exchanger 6, so that the heat required for a partial steam reforming reaction is given to the mixed gas, and therefore, the heated mixed gas introduced into the reactor 8 undergoes the steam reforming reaction, which is partially carried out by the sensible heat of the mixed gas itself.

The steam reforming method in each of the embodiments as set forth above is preferably applicable to a process for producing the reformed gas for ammonia or methanol synthesis process. When the reformed gas for the ammonia synthesis process is to be produced, air is introduced into the combustion reaction section 31 of the reformer 3, thereby producing the secondary reformed gas containing nitrogen as well as hydrogen and carbon oxide. In a case where the reformed gas for the methanol synthesis process is to be produced, oxygen is introduced into the section 31, whereby the secondary reformed gas is produced, containing hydrogen and carbon oxide but excluding nitrogen.

Another arrangements of a plant for producing the reformed gas is shown in FIG. 4, as the forth embodiment of the present invention. In FIG. 4, the elements or means substantially the same as those in the aforementioned embodiments are indicated by the same reference numerals. The plant as illustrated in FIG. 4 has an arrangement suitable, in particular, to a process for producing hydrogen, which comprises the external combustion type of reforming furnace 1 and the heat-exchanger type of reformer 2 having substantially the same constructions as those in FIGS. 5 through 9. The process of this embodiment, however, differs from the aforementioned embodiments in that the internal combustion reactor type of reformer is not provided therein, since such a reforming process involved in production of hydrogen is, in general, adapted to complete the reforming steps without introduction of combustion reactive gas, such as oxygen, into the system.

The reforming furnace 1 and the reformer 2 constituting the steam reforming systems are connected in series by means of the lines L0, L1, L2, L3, L4. The line L0 is in communication with the line L1 through the first heat-exchanger 4, and the line L1 is in communication with the line L3 through the desulfurizer 9, line L2 and third heat-exchanger 6. The line L3 is joined to the upper head 22 of the reformer 2 to be in communication with the line L4 through the reformer tubes 21 in the tube area 20. The line L4 communicates with the reforming tubes 10 of the reforming furnace 1, which is in communication with the area 20 of the reformer 2 through the line L5.

The area 20 is connected through the lines L9, L10 and the third heat-exchanger 6 to the following plant for producing hydrogen (not shown) which carries out the successive process with use of the reformed gas produced by the furnace 1 and the reformer 2.

Similarly to the aforementioned embodiments, the combustion exhaust gas effluent from the heat-transfer section 11 of the reforming furnace 1 is discharged through the first exhaust system including the exhaust lines E1, E2, E3 and the second exhaust system including the discharge line E4.

The line E1 connected to the section 11 is in communication with the line E2 through the first heat-exchanger 4, and the line E2 is in communication with the line E3 through the second heat-exchanger 5. The hydrocarbon feedstock fed through the line L1 takes a heat-exchange action with the combustion exhaust gas in the first heat-exchanger 4 and then, it undergoes a desulfurized reaction in the desulfurizer 9. The hydrocarbons through the line L2 are mixed with the process steam and exchange heat with the reformed gas of the line L9 in the third heat-exchanger 6 so as to be preheated, and then, the preheated mixture is introduced into the reformer 2, in which the reforming reaction of the mixed gas of hydrocarbons and steam is partially carried out. The reformed gas effluent from the reformer 2 is introduced into the reforming tubes 10 of the reforming furnace 1 by the line L4. The reforming reaction of the mixed gas is further carried out in the reforming furnace 1, and the resultant reformed gas is delivered to the line L5 and introduced therethrough into the area 20 of the reformer 2. The heat required in the reformer 2 is given by the sensible heat of the reformed gas, which is delivered to the following process through the line L9, L10 and the third heat-exchanger 6 after supplying the heat to the reformer 2.

The lines LF joined to the burner assemblies 12,13 of the section 11 is connected to the fuel gas source (not shown) through the second heat-exchanger 5. The fuel gas feed from the source takes a heat-exchange action with the combustion exhaust gas of the line E2 in the heat-exchanger 5 to be raised in temperature, and thereafter, the fuel gas is supplied to the respective burners of the burner assemblies 12, 13.

According to the present embodiment, the hydrocarbon steam reforming method preferably applicable to the processes for production of hydrogen can be provided in which oxygen acting as a combustion reactive matter is not fed to the process. Further, the method of this embodiment allows the consumption of the fuel gas feed for the whole system to be eliminated to an extent of 40%–60%. The other arrangements and constituents of this embodiment may be designed to have substantially the same arrangements and constituents as in the aforementioned embodiments, and therefore, further explanation thereon is omitted.

While the present invention has thus been shown and described in connection with the particular preferred embodiments, it is apparent that certain changes and modifications, in addition to those mentioned above, may be made without departing from the basic features of the present invention.

For example, a plurality of heat-exchanger type of reformers 2, e.g., two through four reformers 2, may be provided in the process of the respective embodiments.

Further, another type of high cycle or high speed regenerative combustion system can be employed as the burner assemblies 12, 13 in the respective embodiments. A burner assembly incorporating a regenerative mechanism for preheating a combustion air flow is exemplified, which is provided with a ball or sphere type of regenerator, pellet type of regenerator or the like having a plurality of ceramic balls, spheres, or pellets.

Still further, it is possible to additionally provide single or plural heat-exchangers in series or in parallel with respect to the third heat-exchanger 6 so as to generate or heat steam by such an additional heat-exchanger, thereby rendering the whole heat balance of the process to be regulated.

Further, a plurality of adiabatic reaction type of reactors 8 can be provided in series, wherein the mixed gas passing through the first reactor 8 is reheated by a heat-exchange action with the combustion exhaust gas of the furnace 1 or the primary or secondary reformed gas, and the reheated gas is introduced into the second reactor 8 to undergo a further steam reforming reaction.

INDUSTRIAL APPLICABILITY

The method of hydrocarbon steam reforming is provided in accordance with the present invention, which can improve the thermal efficiency and the waste heat recovery efficiency in the steam reforming system, thereby achieving a high and economical energy efficiency and production efficiency of the whole plant.

What is claimed is:

1. A method of hydrocarbon steam reforming for producing a reformed gas by a steam reforming reaction of a mixed gas of hydrocarbon and steam, which comprises: reforming the mixed gas of hydrocarbon and steam using an arrangement comprising an external combustion reforming furnace and an internal combustion reactor reformer, the reforming furnace being provided with reforming tubes filled with catalyst and heating means for heating the reforming tubes, the heating means including burners for heating the reforming tubes and regenerators for preheating a combustion air flow fed to the burners;

wherein the arrangement further comprises a first flow passage provided with a first regenerator and a second flow passage provided with a second regenerator;

wherein combustion exhaust gas from the reforming furnace passes through the second flow passage provided with the second regenerator while a first burner is in firing operation, thereby heating the second regenerator for preheating combustion air flow to a second burner, whereas said combustion exhaust gas passes through the first flow passage provided with the first regenerator while the second burner is in firing operation, thereby heating the first regenerator for preheating combustion air flow to the first burner, said combustion exhaust gas being controlled to be switched in a time interval no greater than 120 seconds so as to alternately flow through the first and second passages;

wherein a part of said combustion exhaust gas, which is a ratio of the part of said combustion exhaust gas relative to a total amount of said combustion exhaust gas, is introduced from an internal area of the reforming furnace to a heat-exchanger so that at least one component selected from the group consisting of (a) hydrocarbon feedstock, (b) said mixed gas of hydrocarbon and steam, (c) air and/or oxygen, and (d) fuel gas for the reforming furnace is heated by heat-exchange with said part of the combustion exhaust gas;

wherein said ratio of the part of the combustion exhaust gas is predetermined to be a ratio by weight in the range from 10% to 30%.

2. A method according to claim 1, wherein, in said step of reforming a heat exchanger reformer is provided for reforming the mixed gas of hydrocarbon and steam.

3. A method according to claim 2, wherein, the external combustion reforming furnace and the heat-exchanger reformer are arranged in parallel, and wherein, in said step of reforming the mixed gas of hydrocarbon and steam is divided into streams, which are introduced into said reforming furnace and said heat-exchanger reformer, and then, reformed gas effluents from the reforming furnace and the heat-exchanger reformer are respectively introduced into said internal combustion reactor reformer.

4. A method according to claim 2, wherein the external combustion reforming furnace and the heat-exchanger reformer are arranged in series; and wherein in said step of reforming the mixed gas of hydrocarbon and steam is introduced into said heat-exchanger reformer so that a reforming reaction is partially carried out therein, a partially reformed gas effluent therefrom is introduced into said reforming furnace, and then, a reformed gas from the reforming furnace is introduced into said internal combustion reactor reformer.

5. A method according to claim 1, wherein said time interval is no greater than 60 seconds.

6. A method of hydrocarbon steam reforming for producing a reformed gas by a steam reforming reaction of a mixed gas of hydrocarbon and steam, which comprises: reforming the mixed gas of hydrocarbon and steam using an arrangement comprising an external combustion reforming furnace and a heat-exchanger reformer, the reforming furnace being provided with reforming tubes filled with catalyst and heating means for heating the reforming tubes, the heating means including burners for heating the reforming tubes and regenerators for preheating a combustion air flow fed to the burners;

wherein the arrangement further comprises a first flow passage provided with a first regenerator and a second flow passage provided with a second regenerator;

wherein combustion exhaust gas from the reforming furnace passes through the second flow passage provided with the second regenerator while a first burner is in firing operation, thereby heating the second regenerator for preheating combustion airflow to a second burner, whereas said combustion exhaust gas passes through the first flow passage provided with the first regenerator while the second burner is in firing operation, thereby heating the first regenerator for preheating combustion air flow to the first burner, said combustion exhaust gas being controlled to be switched in a time interval no greater than 120 seconds so as to alternately flow through the first and second passages; and wherein a part of said combustion exhaust gas, which is a predetermined ratio of the part of said combustion exhaust gas relative to a total amount of said combustion exhaust gas, is introduced from an internal area of the reforming furnace to a heat-exchanger so that at least one component selected from the group consisting of (a) hydrocarbon feedstock, (b) said mixed gas of hydrocarbon and steam, (c) air and/or oxygen, and (d) fuel gas for the reforming furnace is heated by heat-exchange with said part of the combustion exhaust gas;

wherein said ratio of the part of the combustion exhaust is predetermined to be a ratio by weight in the range from 10% to 30%.

7. A method according to claim 6, wherein said time interval is no greater than 60 seconds.

8. A method of hydrocarbon steam reforming for producing a reformed gas by a steam reforming reaction of a mixed gas of hydrocarbon and steam, which comprises: reforming the mixed gas of hydrocarbon and steam using an arrangement comprising an external combustion reforming furnace and an internal combustion reactor reformer, the reforming furnace being provided with reforming tubes filled with catalyst and heating means for heating the reforming tubes, the heating means including a regenerative burner assembly provided with a regenerator for preheating a combustion air flow to be fed to a burner, wherein combustion exhaust gas of the reforming furnace passes through fluid passages of the regenerator to be in heat-transfer contact with the regenerator so as to heat the regenerator, and the combustion air to be fed to said burner passes through said fluid passages to be in heat-transfer contact with the regenerator so as to be preheated, introduction of the combustion exhaust gas into said fluid passages of the regenerator and introduction of the combustion air into said fluid passages being so controlled as to be changed over in a predetermined time interval so that the combustion exhaust gas and the combustion air alternately flow through said fluid passages; and wherein a part of said combustion exhaust gas, which is a ratio of the part of said combustion exhaust gas relative to a total amount of said combustion exhaust gas, is introduced from an internal area of the reforming furnace to a first heat exchanger so that at least one component selected from the group consisting of (a) hydrocarbon feedstock, (b) said mixed gas of hydrocarbon and steam, (c) air and/or oxygen, and (d) fuel gas for the reforming furnace is heated by heat-exchange with said part of the combustion exhaust gas; and wherein said ratio of the part of the combustion exhaust gas is predetermined to be a ratio by weight in the range from 10% to 30%.

9. A method according to claim 8, wherein, in said step of reforming, a heat exchanger reformer is provided for reforming the mixed gas of hydrocarbon and steam.

10. A method according to claim 9, wherein the external combustion reforming furnace and the heat-exchanger reformer are arranged in parallel, wherein, in said step of reforming the mixed gas of hydrocarbon and steam is divided into streams, which are introduced into said reforming furnace and said heat-exchanger reformer respectively, and then, reformed gas effluents from the reforming furnace and the heat-exchanger reformer are respectively introduced into said internal combustion reactor reformer.

11. A method according to claim 10, wherein, in said step of reforming, reformed gas effluent from said internal combustion reactor reformer is fed to the heat-exchanger reformer so that heat required for reforming reaction in the heat-exchanger reformer is obtained by sensible heat of said reformed gas effluent.

12. A method according to claim 9, wherein the external combustion reforming furnace and the heat-exchanger reformer are arranged in series; and wherein, in said step of reforming, the mixed gas of hydrocarbon and steam is introduced into said heat-exchanger reformer so that a reforming reaction is partially carried out therein, a partially reformed gas effluent therefrom is introduced into said reforming furnace, and then, a reformed gas from the reforming furnace is introduced into said internal combustion reactor reformer.

13. A method according to claim 12, wherein, in said step of reforming, reformed gas effluent from said internal combustion reactor reformer is fed to the heat-exchanger reformer so that heat required for reforming reaction in the heat-exchanger type of reformer is obtained by sensible heat of said reformed gas effluent.

14. A method according to claim 9, wherein, in said step of reforming, reformed gas effluent from said internal combustion reactor reformer is fed to the heat-exchanger reformer so that heat required for reforming reaction in the heat-exchanger reformer is obtained by sensible heat of said reformed gas effluent.

15. A method according to claim 9, wherein, in said step of reforming, said mixed gas of hydrocarbon and steam is introduced into said reforming furnace so that a reforming reaction is partially carried out therein, and partially reformed gas effluent therefrom is introduced into said internal combustion reactor reformer.

16. A method according to claim 9, wherein reformed gas effluent from said internal combustion reactor reformer is fed to a second heat-exchanger which delivers the reformed gas effluent to a reformed gas delivery line therethrough, and wherein at least one component selected from the group consisting of (a) hydrocarbon feedstock, (b) said mixed gas of hydrocarbon and steam, (c) air and/or oxygen, (d) process steam and (e) feed water for a steam generator is heated by a heat-exchange with said reformed gas effluent through said second heat-exchanger.

17. A method according to claim 9, wherein reformed gas effluent from said internal combustion reactor reformer is introduced into a second heat-exchanger as a heating medium, so that the mixed gas of hydrocarbon and steam is heated up to a predetermined temperature range by a heat-exchange with the heating medium in the second heat-exchanger; and wherein said mixed gas of hydrocarbon and steam thus heated is introduced into an adiabatic reaction reactor which comprises a vertical cylindrical pressure vessel filled with catalyst, so that sensible heat of the mixed gas of hydrocarbon and steam allows a steam reforming reaction to be partially carried out therein, and mixed gas of hydrocarbon and steam from said adiabatic reaction reactor is introduced into said reforming furnace.

18. A method according to claim 8, wherein, in said step of reforming, said mixed gas of hydrocarbon and steam is introduced into said reforming furnace so that a reforming reaction is partially carried out therein, and partially reformed gas effluent therefrom is introduced into said internal combustion reactor reformer.

19. A method according to claim 8, wherein reformed gas effluent from said internal combustion reactor reformer is fed to a second heat-exchanger which delivers the reformed gas effluent to a reformed gas delivery line therethrough, and wherein at least one component selected from the group consisting of (a) hydrocarbon feedstock, (b) said mixed gas of hydrocarbon and steam, (c) air and/or oxygen, (d) process steam and (e) feed water for a steam generator is heated by a heat-exchange with said reformed gas effluent through said second heat-exchanger.

20. A method according to claim 8, wherein reformed gas effluent from said internal combustion reactor reformer is introduced into a second heat-exchanger as a heating medium, so that the mixed gas of hydrocarbon and steam is heated up to a predetermined temperature range by a heat-exchange with the heating medium in the second heat-exchanger; and wherein said mixed gas of hydrocarbon and steam thus heated is introduced into an adiabatic reaction reactor which comprises a vertical cylindrical pressure vessel filled with catalyst, so that sensible heat of the mixed gas of hydrocarbon and steam allowsa steam reforming reaction to be partially carried out therein, and mixed gas of hydrocarbon and steam from said adiabatic reaction reactor is introduced into said reforming furnace.

21. A method according to claim 8, wherein said part of the combustion exhaust gas exhausted from said reforming furnace is introduced into said first heat-exchanger as a heating medium, so that the mixed gas of hydrocarbon and steam is heated up to a predetermined temperature range by a heat-exchange with the heating medium in the first heat-exchanger; and wherein said mixed gas of hydrocarbon and steam thus heated is introduced into an adiabatic reaction reactor which comprises a vertical cylindrical pressure vessel filled with catalyst, so that sensible heat of the mixed gas of hydrocarbon and steam allows a steam reforming reaction to be partially carried out therein, and mixed gas of hydrocarbon and steam from said adiabatic reaction reactor is introduced into said reforming furnace.

22. A method of hydrocarbon steam reforming for producing a reformed gas by a steam reforming reaction of a mixed gas of hydrocarbon and steam, which comprises: reforming the mixed gas of hydrocarbon and steam using an arrangement comprising an external combustion reforming furnace and a heat-exchanger reformer, the reforming furnace being provided with reforming tubes filled with catalyst and heating means for heating the reforming tubes, the heating means including a regenerative burner assembly provided with a regenerator for preheating a combustion air flow to be fed to a burner;

wherein combustion exhaust gas of the reforming furnace passes through fluid passages of the regenerator to be in heat-transfer contact with the regenerator so as to heat the regenerator, and the combustion air to be fed to said burner passes through said fluid passages to be in heat-transfer contact with heated regenerator so as to be preheated, introduction of the combustion exhaust gas into said fluid passages of the regenerator and introduction of the combustion air into the same fluid passages being so controlled as to be changed over in a predetermined time interval so that the combustion exhaust gas and the combustion air alternately flow through said fluid passages, and wherein a part of said combustion exhaust has, which is a ratio of the part of said combustion exhaust gas relative to a total amount of said combustion exhaust gas, is introduced from an internal area of the reforming furnace to a first heat exchanger so that at least one component selected from the group consisting of (a) hydrocarbon feedstock, (b) said mixed gas of hydrocarbon and steam, (c) air and/or oxygen, and (d) fuel gas for the reforming furnace is heated by heat-exchange with said part of the combustion exhaust gas; and wherein said ratio of the part of the combustion exhaust gas is predetermined to be a ratio by weight in the range from 10% to 30%.

23. A method according to claim 22, wherein, in said step of reforming, the mixed gas of hydrocarbon and steam is introduced into said heat-exchanged reformer so that a reforming reaction is partially carried out therein and partially reformed gas effluent therefrom is introduced into said reforming furnace; and wherein reformed gas obtained by said reforming furnace is fed to said heat-exchanger reformer, so that heat required for the heat-exchanger reformer is provided by sensible heat of the fed reformed gas.

24. A method according to claim 22, wherein said part of the combustion exhaust gas exhausted from said reforming furnace is introduced into said first heat-exchanger as a heating medium, so that the mixed gas of hydrocarbon and steam is heated up to a predetermined temperature range by a heat-exchange with the heating medium in the first heat-exchanger; and wherein said mixed gas of hydrocarbon and steam thus heated is introduced into an adiabatic reaction reactor which comprises a vertical cylindrical pressure vessel filled with catalyst, so that sensible heat of the mixed gas of hydrocarbon and steam allows a steam reforming reaction to be partially carried out therein, and mixed gas of hydrocarbon and steam from said adiabatic reaction reactor is introduced into said reforming furnace.

25. A method of hydrocarbon steam reforming for producing a reformed gas by a steam reforming reaction of a mixed gas of hydrocarbon and steam, which comprises: reforming the mixed gas of hydrocarbon and steam using an arrangement comprising an external combustion reforming furnace and an internal combustion reactor reformer, the reforming furnace being provided with reforming tubes filled with catalyst and heating means for heating the reforming tubes, the heating means including at least one burner for heating the reforming tubes and at least one regenerator for preheating combustion air flow to be fed to the at least one burner;

wherein combustion exhaust gas of the reforming furnace passes through a fluid passage of said at least one regenerator to be in heat-transferable contact with the at least one regenerator, and combustion air fed to said at least one burner passes through said fluid passage to be in heat-transferable contact with a heated regenerator so as to be preheated, introduction of the combustion exhaust gas in said fluid passage of said at least one regenerator and introduction of the combustion air into said fluid passage being so controlled as to be changed over in a time interval no greater than 120 seconds so that the combustion exhaust gas and the combustion air alternately flow through said fluid passage;

wherein a part of said combustion exhaust gas, which is a ratio of the part of said combustion exhaust gas relative to a total amount of said combustion exhaust gas, is introduced from an internal area of the reforming furnace to a heat-exchanger so that at least one component selected from the group consisting of (a) hydrocarbon feedstock, (b) said mixed gas of hydrocarbon and steam, (c) air and/or oxygen, and (d) duel gas for the reforming furnace is heated by heat-exchange with said part of the combustion exhaust gas; and wherein said ratio of the part of the combustion exhaust gas is predetermined to be a ratio by weight in the range from 10% to 30%.

26. A method according to claim 25, wherein said time interval is no greater than 60 seconds.

* * * * *